(12) United States Patent
Yasini et al.

(10) Patent No.: US 11,960,020 B2
(45) Date of Patent: Apr. 16, 2024

(54) SHARING OF USER EQUIPMENT STATES

(71) Applicant: Telefonaktiebolaget LM Ericsson (publ), Stockholm (SE)

(72) Inventors: Sholeh Yasini, Sundbyberg (SE); Torbjörn Wigren, Uppsala (SE); Patrik Persson, Järfälla (SE)

(73) Assignee: Telefonaktiebolaget LM (publ), Stockholm (SE)

( * ) Notice: Subject to any disclaimer, the term of this patent is extended or adjusted under 35 U.S.C. 154(b) by 302 days.

(21) Appl. No.: 17/594,671

(22) PCT Filed: Apr. 26, 2019

(86) PCT No.: PCT/SE2019/050379
§ 371 (c)(1),
(2) Date: Oct. 26, 2021

(87) PCT Pub. No.: WO2020/218958
PCT Pub. Date: Oct. 29, 2020

(65) Prior Publication Data
US 2022/0206104 A1 Jun. 30, 2022

(51) Int. Cl.
*H04W 4/02* (2018.01)
*G01S 5/00* (2006.01)
(Continued)

(52) U.S. Cl.
CPC .......... *G01S 5/0294* (2013.01); *G01S 5/0081* (2013.01); *H04W 4/025* (2013.01); *H04W 4/029* (2018.02); *H04W 36/32* (2013.01); *H04W 84/06* (2013.01)

(58) Field of Classification Search
CPC ...... G01S 5/0294; G01S 5/0081; G01S 13/76; H04W 4/025; H04W 4/029; H04W 36/32; H04W 84/06; H04W 24/10; H04W 64/006; H04W 4/40
See application file for complete search history.

(56) References Cited

U.S. PATENT DOCUMENTS

2009/0231183 A1* 9/2009 Nettleton .............. G01S 13/726
342/95
2015/0208228 A1 7/2015 Koskinen et al.
(Continued)

FOREIGN PATENT DOCUMENTS

| CN | 104602218 A | 5/2015 |
|---|---|---|
| WO | 2018/156696 A1 | 8/2018 |
| WO | 2019004925 A1 | 1/2019 |
| WO | 2020/218958 A1 | 10/2020 |
| WO | 2020218957 A1 | 10/2020 |

OTHER PUBLICATIONS

James Hare et al., "Distributed Smart Sensor Scheduling for Underwater Target Tracking," 2014, 6 pages, IEEE.
(Continued)

*Primary Examiner* — Kenneth T Lam
(74) *Attorney, Agent, or Firm* — Nicholson De Vos Webster & Elliott LLP

(57) ABSTRACT

A method for sharing user equipment state estimates between nodes within a wireless communication network comprises initiating of transmission of at least one of obtained user equipment kinematic state estimate information and obtained user equipment type state estimate information to a receiving network node as a response to an obtained indication of a need for sharing user equipment state estimates. The obtained user equipment kinematic state estimate information comprising a latest kinematic state update time, as well as mode state vector estimates, mode covariance matrices and mode probabilities for at least one user equipment kinematic mode. The obtained user equipment type state estimate information comprising a latest type state update time and a type state probability estimate. A method for receiving and propagating the user equipment state estimates, and devices for both methods are also disclosed.

12 Claims, 16 Drawing Sheets

(51) Int. Cl.
　　*G01S 5/02*　　　(2010.01)
　　*H04W 4/029*　　(2018.01)
　　*H04W 36/32*　　(2009.01)
　　*H04W 84/06*　　(2009.01)

(56) References Cited

U.S. PATENT DOCUMENTS

2015/0215742 A1* 7/2015 Ikeda ................ H04W 68/02
　　　　　　　　　　　　　　　　　　　455/456.1
2020/0331590 A1* 10/2020 Yuksel ................ B64C 27/24
2022/0187793 A1* 6/2022 Berntorp ............. G05D 1/0088

OTHER PUBLICATIONS

Hui Long et al., "Dynamic Nearest Neighborhood Collaboration Target Tracking for WSN," 2011, pp. 707-714, SciVerse ScienceDirect, Energy Procedia 11, Elsevier Ltd.
Henrik Ryden et al., "Rogue Drone Detection: A Machine Learning Approach," 2019, 6 pages, IEEE Wireless Communications and Networking Conference (WCNC).
Jennifer Sander et al., "High-level data fusion component for drone classification and decision support in counter UAV," 2018, 10 pages, Proc. of SPIE vol. 10651, 106510F.
Torbjorn Wigren, "Wireless Hybrid Positioning Based on Surface Modeling with Polygon Support," 2018, 7 pages, IEEE.
International Preliminary Report on Patentability, PCT App. No. PCT/SE2019/050377, dated Nov. 4, 2021, 9 pages.
International Preliminary Report on Patentability, PCT App. No. PCT/SE2019/050379, dated Nov. 4, 2021, 21 pages.
International Search Report and Written Opinion, PCT App. No. PCT/SE2019/050377, dated Jan. 23, 2020, 11 pages.
International Search Report and Written Opinion, PCT App. No. PCT/SE2019/050379, dated Nov. 18, 2019, 23 pages.
Notice of Allowance, U.S. Appl. No. 17/594,670, dated Jan. 5, 2024, 15 pages.
Office Action, CN App. No. 201980095826.1, dated Dec. 26, 2023, 12 pages of Original Document Only.

* cited by examiner

SHARING OF USER EQUIPMENT STATES

CROSS-REFERENCE TO RELATED APPLICATIONS

This application is a National stage of International Application No. PCT/SE2019/050379, filed Apr. 26, 2019, which is hereby incorporated by reference.

TECHNICAL FIELD

The proposed technology relates in general to state estimate sharing, between nodes of a wireless communication system, and in particular to methods and devices for user equipment state estimate sharing, typically between Next Generation Node Bs (gNBs) or Evolved Node Bs (eNBs).

BACKGROUND

Today, airborne radio-controlled drones are becoming more and more common. These so-called drones have in the past been limited to stay within range of the radio control equipment dedicated to control the drone.

However, recently functionality allowing drones to be remotely controlled over the cellular network has increased their range considerable. This can e.g. be achieved by attaching a Long-Term Evolution (LTE) User Equipment (UE) to the drone and by coupling the UE to the navigation system of the drone. This way, the drone is enabled to travel over multiple cells resulting in ranges that is limited only by the battery of the drone. In some markets, this is already being regulated, and UEs attached to drones are registered as such. However, a large amount of users fail to register, such users being denoted as "rogue drones".

The LTE, or in the future New Radio (NR), capable drones need to be restricted in terms of their flight. This is particularly the case for rogue drones.

A first reason for this is that rogue drones that transmit and receive cellular radio messages at significant altitudes, tend to create more interference than ground based UEs, simply because there are less obstacles when the altitude of the drone is significant, propagation can then be close to free-space propagation. The interference therefore reaches further and creates interference problems also in adjacent cells. At higher altitudes drones may also be served by the sidelobes of radio base station antennas that are downtilted. This may increase the risk of sudden signal changes.

A second reason is that rogue drones create hazardous situations when flying illegally in certain parts of the airspace. Examples include airports, where commercial air traffic may be at danger, military restricted areas, and the airspace over densely populated areas where a crash would be likely to cause human injuries. On Dec. 20 2018, Gatwick International Airport, London, UK was e.g. closed down due to rogue drone presence. A similar situation arose at Heathrow International Airport, London, UK, on Jan. 8, 2019. The severity of the problem, and the urgency of developing solutions to counter illegal flight cannot be underestimated.

The general problem is thus to gain information of when and where rouge drones are travelling. There are several possible approaches to gain such useful information by use of the wireless communication network nodes themselves, since drone control signals are transmitted over the cellular network to extend the range of the drone, as measured with respect to the controlling pilot. A consequence of this is that it is very likely that the drone travels over coverage areas of several cells. This in turn means that drone information, e.g. estimated kinematic states and types, obtained in one cell becomes void very quickly. The whole drone information collection, e.g. a state estimation and drone detection process, would need to be re-started. The consequence of that would be loss of e.g. kinematic state estimate accuracy and a very significant deterioration of the drone detection performance.

SUMMARY

It is an object to provide methods and devices for sharing of user equipment state estimates between nodes within a wireless communication network.

This and other objects are met by embodiments of the proposed technology. According to a first aspect, there is provided a method for sharing user equipment state estimates between nodes within a wireless communication network comprising initiating of transmission of at least one of obtained user equipment kinematic state estimate information and obtained user equipment type state estimate information to a receiving network node as a response to an obtained indication of a need for sharing user equipment state estimates. The obtained user equipment kinematic state estimate information comprises a latest kinematic state update time, as well as mode state vector estimates, mode covariance matrices and mode probabilities valid for the latest kinematic state update time for at least one user equipment kinematic mode. The obtained user equipment type state estimate information comprises a latest type state update time, as well as a type state probability estimate valid for the latest type state update time.

According to a second aspect, there is provided a method for sharing user equipment state estimates between nodes in a wireless communication network comprising receiving of at least one of user equipment kinematic state estimate information and user equipment type state estimate information from a sending network node as a response to an indication of a need for sharing user equipment state estimates. The user equipment kinematic state estimate information comprises a latest kinematic state update time, as well as mode state vector estimates, mode covariance matrices and mode probabilities valid for the latest kinematic state update time for at least one user equipment kinematic mode. The user equipment type state estimate information comprises a latest type state update time, as well as type state probability estimate valid for the latest type state update time. The user equipment kinematic state estimate and/or the user equipment type state estimate is propagated to a present time based on the user equipment kinematic state estimate information or the user equipment type state estimate information, respectively.

According to a third aspect, there is provided a network node configured for sharing user equipment state estimates within a wireless communication network. The network node is configured to initiate transmission of at least one of obtained user equipment kinematic state estimate information and obtained user equipment type state estimate information to a receiving network node as a response to an obtained indication of a need for sharing user equipment state estimates. The obtained user equipment kinematic state estimate information comprises a latest kinematic state update time, as well as mode state vector estimates, mode covariance matrices and mode probabilities valid for the latest kinematic state update time for at least one user equipment kinematic mode. The obtained user equipment type state estimate information comprises a latest type state update time, as well as a type state probability estimate valid for the latest type state update time.

According to a fourth aspect, there is provided a network node configured for sharing user equipment state estimates within a wireless communication network. The network node is configured to receive at least one of user equipment kinematic state estimate information and user equipment type state estimate information from a sending network node as a response to an indication of a need for sharing user equipment state estimates. The user equipment kinematic state estimate information comprises a latest kinematic state update time, as well as mode state vector estimates, mode covariance matrices and mode probabilities valid for the latest kinematic state update time for at least one user equipment kinematic mode. The user equipment type state estimate information comprises a latest type state update time, as well as type state probability estimate valid for the latest type state update time. The network node is further configured to propagate the user equipment kinematic state estimate and/or the user equipment type state estimate to a present time based on the user equipment kinematic state estimate information or the user equipment type state estimate information, respectively.

According to a fifth aspect, there is provided a wireless communication network comprising at least one network node according to the third aspect and at least one network node according to the fourth aspect.

According to a sixth aspect, there is provided a computer program comprising instructions, which when executed by at least one processor, cause the processor(s) to initiate transmission of at least one of obtained user equipment kinematic state estimate information and obtained user equipment type state estimate information to a receiving network node as a response to an obtained indication of a need for sharing user equipment state estimates. The obtained user equipment kinematic state estimate information comprises a latest kinematic state update time, as well as mode state vector estimates, mode covariance matrices and mode probabilities valid for the latest kinematic state update time for at least one user equipment kinematic mode. The obtained user equipment type state estimate information comprises a latest type state update time, as well as type state probability estimate valid for the latest type state update time.

According to a seventh aspect, there is provided a computer program comprising instructions, which when executed by at least one processor, cause the processor(s) to receive at least one of user equipment kinematic state estimate information and user equipment type state estimate information from a sending network node as a response to an indication of a need for sharing user equipment state estimates. The user equipment kinematic state estimate information comprises a latest kinematic state update time, as well as mode state vector estimates, mode covariance matrices and mode probabilities valid for the latest kinematic state update time for at least one user equipment kinematic mode. The user equipment type state estimate information comprises a latest type state update time, as well as type state probability estimate valid for the latest type state update time. The instructions, when executed by the processor(s), further cause the processor(s) to propagate the user equipment kinematic state estimate and/or the user equipment type state estimate to a present time based on the user equipment kinematic state estimate information or the user equipment type state estimate information, respectively.

According to an eighth aspect, there is provided a computer-program product comprising a computer-readable medium having stored thereon a computer program of the sixth and/or seventh aspect.

An advantage of the proposed technology is that functionality is provided enabling creation of a wide area air situation awareness picture regarding drones exploiting wireless networks.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

The present technology addresses the above mentioned problems by disclosing functionality enabling creation of a wide area air situation awareness picture regarding drones exploiting wireless networks.

This can be accomplished by performing estimation of UE kinematic states and UE type states on a sufficiently high level in a wireless communication network such that all cells always are covered. This requires extensive signalling of measurement data deep into the core network and is therefore not considered as being very attractive.

Alternatively, there has to be provided possibilities to forward collected drone information, e.g. kinematic state estimates and/or type state estimates, within the wireless communication network. Such a sharing of user equipment state estimates could for instance be performed between a present serving cell and a next serving cell. The forwarding is thus typically of interest if a change in e.g. serving cell is in progress, e.g. in a handover process. However, today there is no signaling functionality available to support such forwarding actions.

The present ideas are based on the prerequisite that there are available state estimates of a UE in a network node. The details of the actual methods for achieving such estimates are not considered as being of fundamental importance for the present ideas. Instead, as long as the final type of estimates and associated data is provided, the detailed way in which they are obtained are of no essential importance.

However, for a better understanding of the proposed technology, it may be useful to begin with a brief overview of possible approaches for providing such UE state estimates.

Since wireless communication systems are designed to cope with moving objects, there are different kinds of kinematic information of UEs available in different parts of a wireless communication system. Useful kinematic information could e.g. comprise distance measurements or even location determinations. Such kinematic information could be utilized to estimate e.g. positions of a UE. However, the same type of kinematic information would also be possible to combine into information about motion properties of a UE. In other words, an estimation of a kinematic state could, if the right information and estimation techniques were available.

Once having access to kinematic state estimations of UEs, different kinds of motion patterns can be extracted. Since a drone, at least in some aspects and in some situations, have unique kinematic behaviours, a combination of kinematic information with knowledge about these unique features of drones, a type state estimation is possible to perform.

Figure 1:
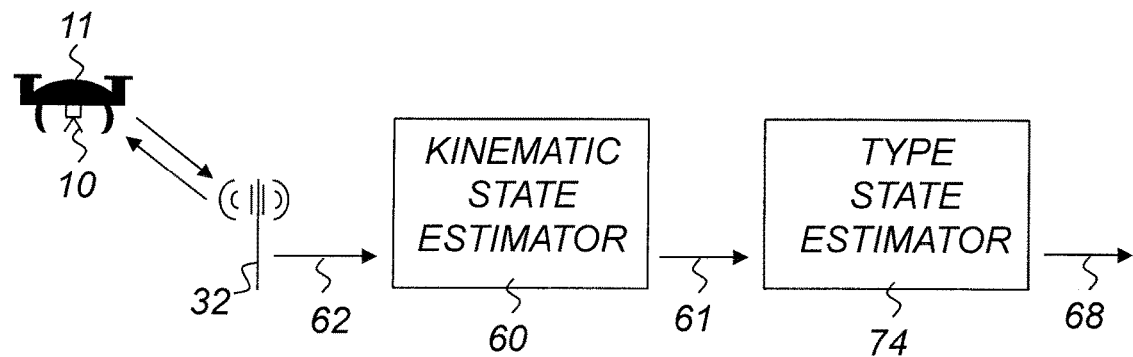
FIG. 1 is a schematic illustration of the drone detection principle.

The drone state estimation problem treated by this is schematically illustrated in FIG. 1. A drone 11, comprising a UE 10 moves e.g. in a restricted area. The drone 11 communicates via base stations, e.g. eNBs/gNBs 32, which provide noisy kinematic measurements 62. These kinematic measurements 62 can e.g. be of the range between respective eNB/gNB 32 and the drone. A UE kinematic state estimator 60 uses these noisy kinematic measurements 62 to provide kinematic state estimations 61. A UE type state estimator 74 can analyze the state estimations 61 and, by using knowledge of the characteristic movements of a drone 11, determine that the UE 10 has to be attached to a drone 11. Different kinds of measures can thus be performed based on drone type information 68.

As mentioned briefly above, different kinds of measurements can be utilized to create kinematic state estimations. One example is range measurements, i.e. measurements of quantities that are related to the distance between a stationary network node and a UE. There are several possibilities for range measurement. One way is to perform path loss measurements. That is, however, generally not accurate enough for the present applications, since the path loss is affected by radio fading and since range needs to be computed from an assumed radio propagation model. However, in particular applications, e.g. where the radio fading is well modelled, path loss measurements may contribute with an acceptable range measurement.

A better and more accurate basis for measurement of range is typically to measure the travel time of radio waves to/from a base station and a UE. One alternative is then to measure the travel time of radio waves from a base station to a UE and back, i.e. a round-trip-time (RTT) measurement. A description of the principles of RTT measurements is disclosed in Appendix A.

The measurements discussed above can thus be utilized for estimation purposes. The technical field of moving object kinematic state estimation is, as such, mature today, with many operational systems worldwide. See for example any of the many available textbooks on the subject. One alternative is a so-called multi-sensor state estimation system. This is further described in Appendix B.

To be able to accurately estimate the movement, i.e. the kinematic state, of a drone, it is first realized that drones fly in very specific ways or modes of movement. These modes of movement need to be reflected by the optimal estimator applied for measurement processing. Some alternatives of kinematic state estimations are described in Appendix C.

The modes of movement are preferably adapted to the application, where they are employed. In the present case, the modes of movement should therefore preferably model movements that are of most benefit for any estimation processes. Thus, when dealing with drone detection, the movement mode model should reflect characteristic features of a drone movement. In Appendix F, one possible 3-mode model is presented, which is believed to be one suitable approach for obtaining useful kinematic state estimations.

Ground surface modeling may also be of interest. This is briefly described in Appendix G.

A note on discretization may be useful for the reader. The models discussed in the detailed description of the present technology, are defined in continuous time, using differential equations. For computer implementation, they need to be discretized. Given a continuous time Wiener process:

$$dx = Axdt + Bdv \quad (1)$$

where x is the state, A is a systems matrix, B is a disturbance gain matrix and v is the disturbance, it follows that the discrete time state equation after sampling with the sampling period T is:

$$x(k+1) = F_i x(k) + v(k) \quad (2)$$

where $$F_i = e^{A_i T}, i = 1, 2, 3 \quad (3)$$

$$v(k) = \int_0^T e^{A(T-\tau)} B_i \hat{v}(kT + \tau) d\tau, i = 1, 2, 3 \quad (4)$$

and with the discretized process noise covariance:

$$Q = \mathbb{E}[v(k)v(k)']. \quad (5)$$

It is assumed in the present disclosure that all continuous time equations are discretized like this.

Also a drone type state estimation procedure has to be presented here. Such a drone type estimation algorithm should arrange for discrimination between airborne rogue drones, and terrestrial moving and fix UEs, like laptops, pedestrians, users in cars and trains. A detection algorithm is as mentioned above based on kinematic state estimates, typically obtained in a single gNB or eNB. Preferably, the kinematic state estimates are based on movement mode estimates and a ground altitude model. The drone detection presented here is preferably using new Bayesian processing of estimated rogue drone states. The details are given in Appendix H.

From the above description, it is understood that there may be provided a system and situation where a network node of a wireless communication network has availability to UE state estimates. Such UE state estimates can be one or both of UE kinematic state estimates and UE type state estimates.

Kinematic state estimates comprises estimates of parameters or signals associated with position and motion, e.g. location, speed and/or acceleration. These estimated parameters or signals are typically achieved as a vector. The configuration of the vector is determined by a kinematic mode, which defines the quantities to be estimated. The results of the estimation are typically referred to as state vector estimates. As was discussed above, if an estimation process operates with a plurality of possible kinematic modes, there might be one state vector estimate for each mode, i.e. a mode state vector estimate.

During the estimation, also the relation between the different quantities are explored. These relations are typically referred to and presented as mode covariance matrices.

In estimation processes operating with a plurality of possible kinematic modes, there is also typically a mode probability, expressing the probability for that mode to be the most correct one. For a single UE kinematic mode estimation process, the mode probability always becomes equal to unity.

Type state estimates comprises estimates of a probability of an identification of an object to be of a particular type. In the present case, concerning detection of drones, a typical type state will be "drone". In a simple embodiment, as described above, a two-state estimation approach having the states "drone" and "not drone" can be used.

If a network node, having one or both of UE kinematic state estimates and UE type state estimates, is reached by an indication that this state estimates should be shared with another network node, it has first to be decided which information that has to be provided. One possibility is of course to copy all available information associated with the estimation process and transfer all data to the receiving node. However, this may involve very large amounts of data and will be unsuitable for operations in a general wireless communication network.

Instead, the network node initiates a transmission of selected parts of the estimation data as a response to an obtained indication of a need for sharing UE state estimates. In order to continue an IMM kinematic state estimation seamlessly after sharing into a new network node, some kinematic state estimate information, comprising parts of the available estimates as well as other information associated therewith, needs to be signaled to the new network node. This kinematic state estimate information should thereby comprise at least the mode state vector estimates, the mode covariance matrices and the mode probabilities for the at least one kinematic mode. These objects are assumed to be valid at a certain update time. This time of the last update should also be included in the kinematic state estimate information.

In order for the receiving network node to know what UE the information concerns, also the ID of the UE is provided as a part of the kinematic state information. However, this ID information may also be provided separately, e.g. in the sharing is caused by a HO request, where the ID of the UE in question is shared by other means. This ID, being the ID of the drone, may be the serving temporary mobile subscription identity (STMSI)

In the notation of the descriptions in the Appendices, the kinematic state estimate information should at least comprise:

$\hat{x}^j(k|k)$—the mode state vector estimates
$P^j(k|k)$—the mode covariance matrices
$\mu_j(k)$—the mode probabilities, and
$t_{lastupdate}$—the time of the last update.
Here j indicates the number of the particular mode.

In some applications, it may also be preferable if tracking coordinate system parameters are shared.

Furthermore, in one embodiment, system noise covariance matrices for each mode and/or measurement noise covariance matrices for each mode are also shared.

In order to continue a type state estimation seamlessly after sharing into a new network node, some type state estimate information, comprising parts of the available estimates, needs to be signaled to the new network node. This type state estimate information should thereby comprise at least the drone probability estimate. This object is assumed to be valid at a certain update time. This time of the last update should also be included in the type state estimate information. This information will enable so called propagation to the time the first update in the new serving cell is performed. It is noted that kinematic state estimation updates and type state estimation updates do not need to be performed simultaneously in time.

In the notation of the descriptions in the Appendices, the kinematic state estimate information should at least comprise:

$P(D|z^r)$—drone probability estimate
$t_{lastupdate}$—the time of the last update of the type estimate.
Optionally, also the "no drone" probability estimate $P(\neg D|z^r)$ is shared.

Furthermore, in one embodiment, the UE type state estimate information further comprises parameters of discrimination features for the UE type state estimation.

Figure 7:
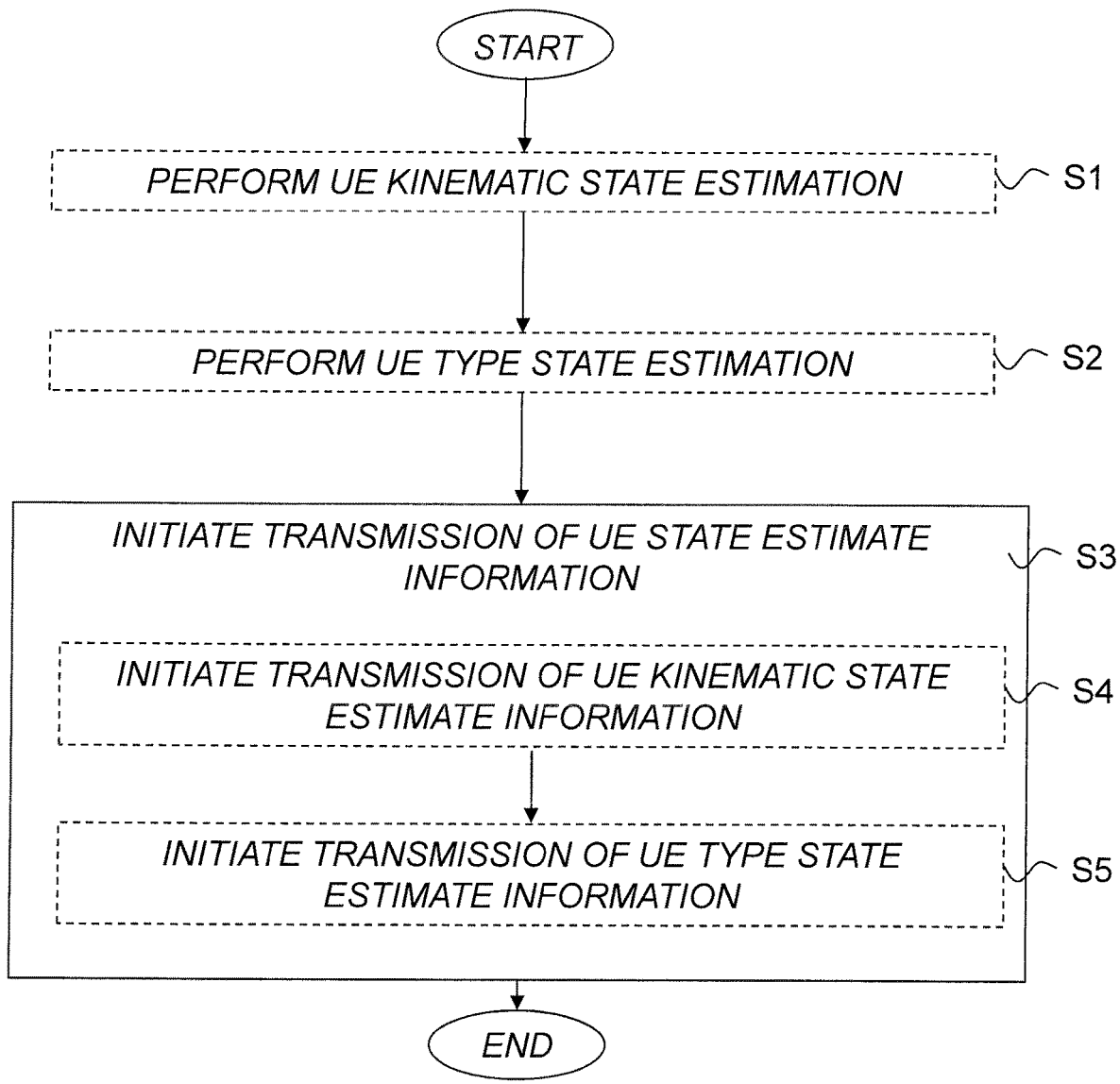
FIG. 7 is a schematic flow diagram illustrating steps of an embodiment of a method for sharing user equipment state estimates between nodes within a wireless communication network.

FIG. 7 is a schematic flow diagram illustrating steps of an embodiment of a method for sharing user equipment state estimates between nodes within a wireless communication network. In step S3, transmission of at least one of obtained UE kinematic state estimate information and obtained UE type state estimate information to a receiving network node is initiated as a response to an obtained indication of a need for sharing UE state estimates. The obtained UE kinematic state estimate information comprises a latest kinematic state update time. The obtained UE kinematic state estimate information also comprises mode state vector estimates, mode covariance matrices and mode probabilities valid for the latest kinematic state update time for at least one UE kinematic mode. The obtained UE type state estimate information comprises a latest type state update time. The obtained UE type state estimate information also comprises a type state probability estimate valid for the latest type state update time.

As indicated in the figure, in one embodiment, the step S3 of initiating transmission comprises initiating S4 transmission of obtained UE kinematic state estimate information.

In a further embodiment, the method comprises step S1, in which a UE kinematic state estimation is performed, giving the mode state vector estimates, the mode covariance matrices, and the mode probabilities.

In one embodiment, the obtained UE kinematic state estimate information further comprises tracking coordinate system parameters.

In one embodiment, the obtained UE kinematic state estimate information further comprises system noise covariance matrices for each of the at least one user equipment kinematic mode.

In one embodiment, the obtained UE kinematic state estimate information further comprises measurement noise covariance matrices for each of the at least one user equipment kinematic mode.

As indicated in the figure, in one embodiment, the step S3 of initiating transmission comprises initiating S5 transmission of obtained UE type state estimate information.

In a further embodiment, the method comprises step S2, in which a UE type state estimation is performed, giving the type state probability estimate.

In one embodiment, the UE type state probability estimate comprises a probability estimate for the UE being a drone.

In one embodiment, the UE type state estimate information further comprises a probability estimate for the UE not being a drone.

In one embodiment, the UE type state estimate information further comprises parameters of discrimination features for the UE type state estimation.

Figure 8:
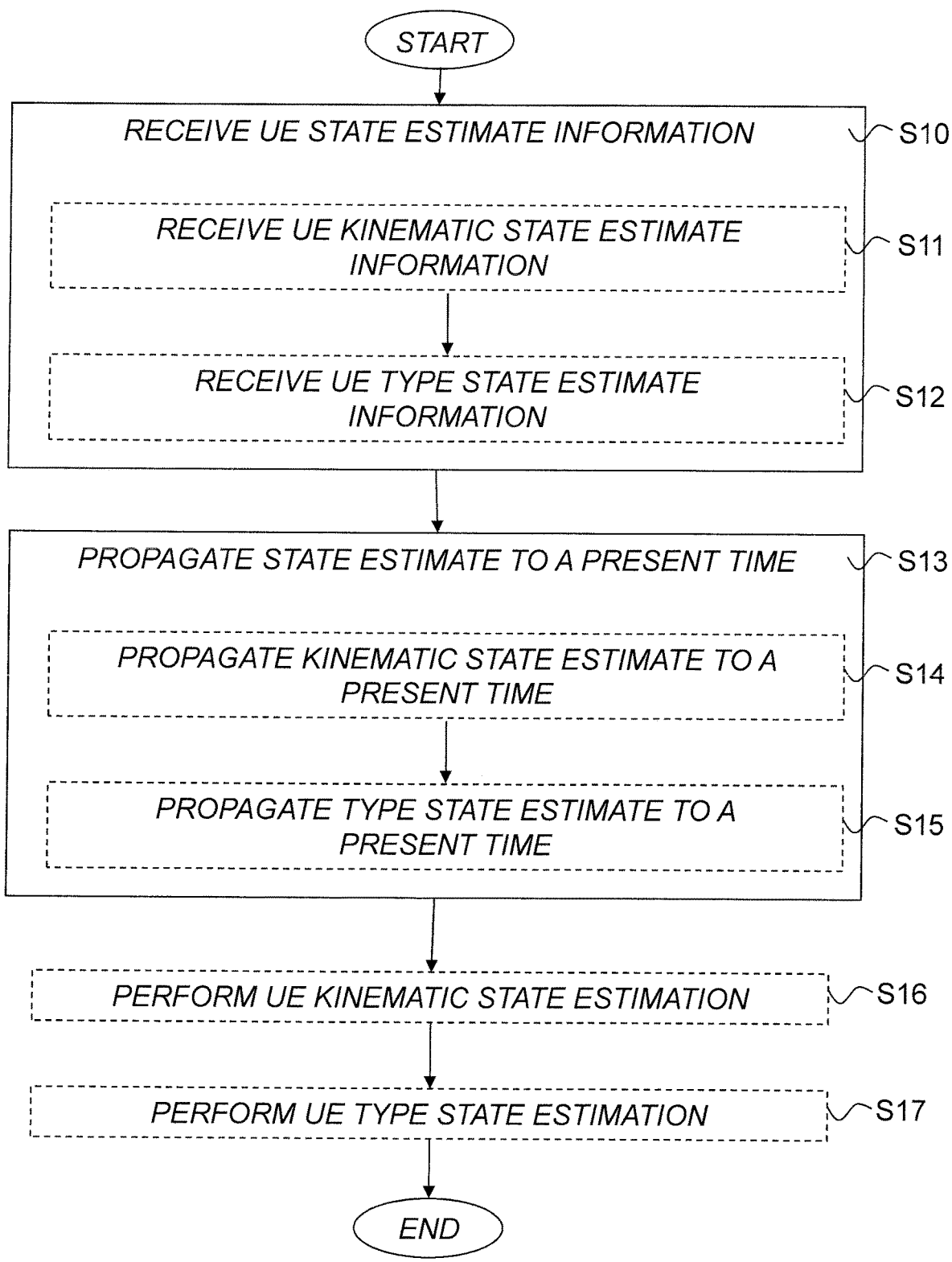
FIG. 8 is a schematic flow diagram illustrating steps of another embodiment of a method for sharing user equipment state estimates between nodes within a wireless communication network.

FIG. 8 is a schematic flow diagram illustrating steps of an embodiment of a method for sharing UE state estimates between nodes in a wireless communication network. In step S10, at least one of UE kinematic state estimate information and UE type state estimate information is received from a sending network node as a response to an indication of a need for sharing UE state estimates. The UE kinematic state estimate information comprises a latest kinematic state update time. The UE kinematic state estimate information also comprises mode state vector estimates, mode covariance matrices and mode probabilities valid for the latest kinematic state update time for at least one UE kinematic mode. The UE type state estimate information comprises a latest type state update time. The UE type state estimate information also comprises type state probability estimate valid for the latest type state update time.

In step S13, at least one of the UE kinematic state estimate and the UE type state estimate is propagated to a present time based on the UE kinematic state estimate information or the UE type state estimate information, respectively.

For instance, when the UE state estimates are received in a new serving eNB/gNB the system time, $t_{system}$, is retrieved.

The kinematic state estimates and/or the type state estimates, i.e. the drone probability, are propagated from $t_{lastupdate}$ to $t_{system}$. The propagation can be performed in any way known, as such, in prior art. Appendix E presents one non-limiting example.

As indicated in the figure, in one embodiment, the step S10 of receiving comprises the step S11 of receiving UE kinematic state estimate information. Likewise, the step S13 of propagating comprises the step S14 of propagating the kinematic state estimate to a present time.

In a further embodiment, the method comprises the further step S16 of performing a UE kinematic state estimation. This UE kinematic state estimation is based on the mode state vector estimates, the mode covariance matrices, and the mode probabilities, propagated to a present time based on the latest kinematic state update time.

In one embodiment, the received UE kinematic state estimate information further comprises tracking coordinate system parameters.

In one embodiment, the received UE kinematic state estimate information further comprises system noise covariance matrices for each of the at least one UE kinematic mode.

In one embodiment, the received UE kinematic state estimate information further comprises measurement noise covariance matrices for each of the at least one UE kinematic mode.

As indicated in the figure, in one embodiment, the step S10 of receiving comprises the step S12 of receiving UE type state estimate information. Likewise, the step S13 of propagating comprises the step 15 of propagating 30 the type state estimate to a present time. The propagation can be performed in any way known, as such, in prior art. Appendix H presents one non-limiting example.

In a further embodiment, the method comprises the further step S17 of performing a UE type state estimation. This UE type state estimation is based on the type state probability estimate, propagated to a present time based on the latest type state update time.

In one embodiment, the received UE type state probability estimate comprises a probability estimate for the UE being a drone.

In one embodiment, the received UE type state estimate information further comprises a probability estimate for the UE not being a drone.

In one embodiment, the received UE type state estimate information further comprises parameters of discrimination features for the UE type state estimation.

Figure 9:
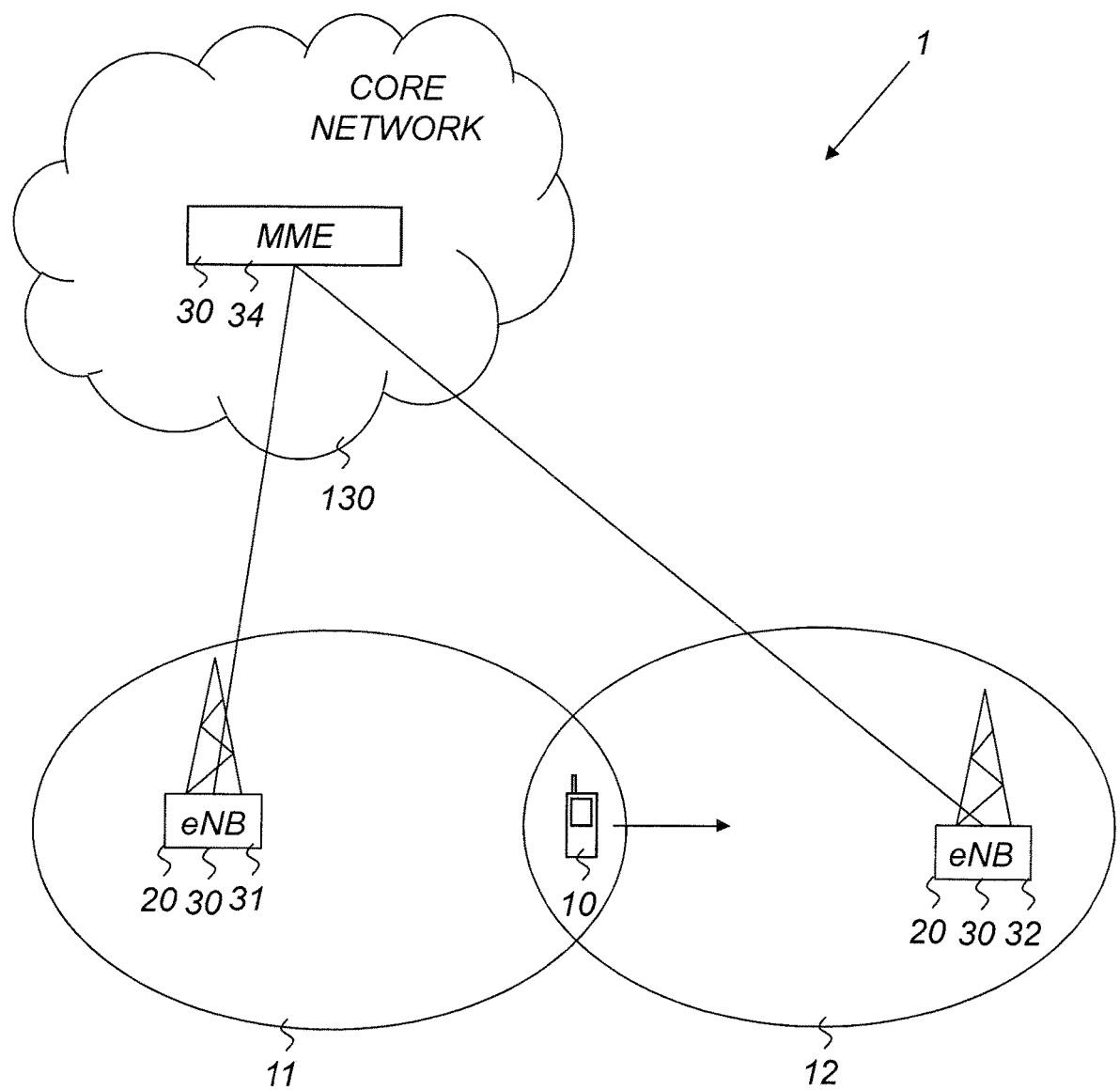
FIG. 9 illustrates schematically a wireless communication system.

FIG. 9 illustrates schematically a wireless communication system 1. A network node 30 in the shape of a base station 20, in this embodiment an eNB, serves a UE 10 within a first cell 11. The UE is, as indicated by the arrow, moving out from the first cell 11 and approaches a second cell 12. The network node of the first cell 11 is thus a source network node 31. The second cell 12 is served by a target network node 32. The base stations 20 are interconnected via at least one network node 30, in this embodiment a Mobility Management Entity (MME) 34, of a core network 130. When the UE leaves the first cell 11 and enters into the second cell 12, a sharing of UE state estimates is preferably desired.

In one aspect of the present technology, a wireless communication network 1 comprises at least one network node 31 according to the above description for initiating a transmission of UE state estimates and at least one network node 32 according to the above description for reception and propagation of UE state estimates.

As mentioned above, a typical situation in which a sharing of estimates is to be performed is in connection with a handover (HO). Thus, in one embodiment, with reference to FIG. 7, the indication of a need for sharing UE state estimates is a handover request.

Likewise, in one embodiment, with reference to FIG. 8, the indication of a need for sharing UE state estimates is a handover request.

HO can be performed in different ways. Some standard procedures, based on the S1 and X2 interfaces, respectively, are presented in Appendix I. In these procedures, there are presently no opportunities to add any UE estimate information.

Therefore, in one embodiment, present HO signalling is extended to allow for transferring of UE estimate information between eNBs during a HO procedure.

However, since UE estimation is not a compulsory part of the wireless communication systems, a change in the standards for HO may not be the most appropriate way.

An alternative approach is to use "private messages". A "private message" is a conveyor IE that typically is a manufacturer or operator specific IE typically placed as the very last element within a specific standard X2AP message or IE or within a specific standard S1AP message or IE. It is typically used to convey manufacturer or operator proprietary IEs that are applicable as a complement to the specific standard X2AP/S1AP message or IE.

In one embodiment, with reference to FIG. 7, transmission is to be performed via a private message.

Likewise, in one embodiment, with reference to FIG. 8, the receiving is performed via a private message.

Figure 12:
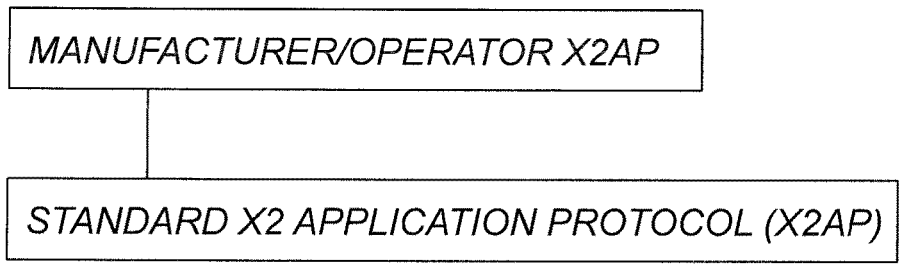
FIG. 12 illustrates an X2AP sub-layer architecture.

FIG. 12 illustrates a manufacturer/operator X2AP message, e.g. an Ericsson X2AP, as extension to a standard X2 application protocol X2AP. Manufacturer/operator X2AP is modelled as a protocol sub-layer on top of the standard X2AP sub-layer.

As one embodiment, an Ericsson X2AP conveyor IE is an Ericsson specific IE that is placed as the very last element within a specific standard X2AP message or IE. It is used to convey Ericsson proprietary IEs that are applicable as a complement to the specific standard X2AP message or IE.

With the Ericsson X2AP private extension (Ericsson X2AP), an eNB may offer an extended set of services to its neighbors. Ericsson X2AP Mobility Procedures module contains procedures used to handle UE mobility within the Evolved Universal Terrestrial Radio Access (E-UTRA) network. With the Ericsson X2AP private extension, proprietary extensions may be attached to specific standard X2AP Protocol Data Units (PDUs). Extensions conveyors may be attached at the PDU (message) level or within specific (standard) Information Elements (IEs).

Ericsson X2AP is modelled as a protocol sub-layer on top of the standard X2AP sub-layer. An X2AP-Ericsson-PDU is transported between the peer Ericsson X2AP entities, carried in the PRIVATE MESSAGE provided by the standard X2AP sub-layer. The X2AP-Ericsson-PDUs are typically used for Ericsson specific X2AP procedures.

Extension of standard X2AP PDUs is also used in specific cases. The extensions are used as a complement to the standard X2AP procedures. Those extensions are placed in private IEs within an Ericsson X2AP conveyor IE, attached to a specific standard X2AP PDU message.

Figure 13:
FIG. 13 illustrates an X2 private message procedure.

As illustrated by FIG. 13, on request from a sending Ericsson X2AP entity, the eNB 20A initiating the procedure sends PRIVATE MESSAGE to the peer eNB 20B. The eNB 20A initiating the procedure shall include the X2AP-Ericsson-PDU IE in the PRIVATE MESSAGE. If X2AP-Ericsson-PDU IE is included in the PRIVATE MESSAGE, the receiving eNB 20B shall forward the Ericsson X2AP PDU to the receiving Ericsson X2AP entity.

Figure 14:
FIG. 14 illustrates an X2-based sharing of UE state estimations.

FIG. 14 illustrates the possibility to use the private message for sharing of UE state estimations. The source eNB 31 initiating the sharing procedure shall include the X2AP-Ericsson-PDU IE that contain at least mandatory UE state estimation information, as described above, in the private message. The receiving target eNB 32 extracts the UE state estimation information from the private message.

In one embodiment, with reference to FIG. 7, the transmission is to be performed to a base station.

In one embodiment, with reference to FIG. 7, the transmission is to be performed from a base station.

In one embodiment, with reference to FIG. 8, the receiving is performed in a base station.

In one embodiment, with reference to FIG. 8, the at least one of UE kinematic state estimate information and UE type state estimate information is received from a base station.

Figure 15:
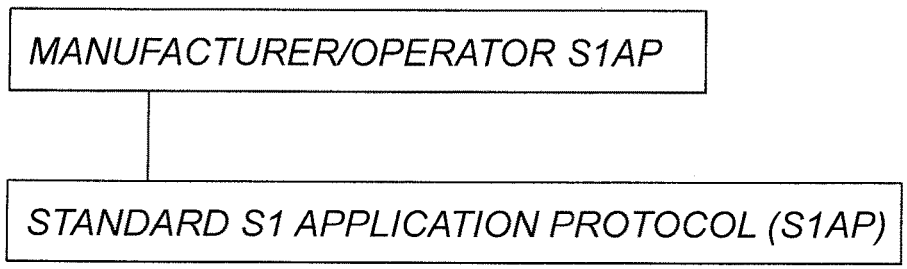
FIG. 15 illustrates an S1AP sub-layer architecture.

The private messages can also be utilized over the S1 interface. FIG. 15 illustrates a manufacturer/operator S1AP message, e.g. an Ericsson S1AP, as extension to a standard S1 application protocol S1AP. Manufacturer/operator S1AP is modelled as a protocol sub-layer on top of the standard S1AP sub-layer.

As one embodiment, an Ericsson S1AP private extension (Ericsson S1AP), an eNB and E-UTRA network may offer an extended set of services to the Evolved Packet Core (EPC) and further to other network entities belonging to other 3GPP technologies or even outside the 3GPP scope of standardization. With the Ericsson S1AP private extension, proprietary extensions may be attached to specific standard S1AP PDUs. Extension conveyors may be attached at the PDU (message) level or within specific (standard) IEs. Ericsson S1AP is modelled as a protocol sub-layer on top of the standard S1AP sub-layer.

Extension of the standard S1AP PDUs is also used in specific cases. Those extensions are used as a complement to the standard S1AP procedures. Those extensions are used as private IEs within an Ericsson S1AP conveyor IE, attached to the specific standard S1AP PDU (message).

Figure 16A:
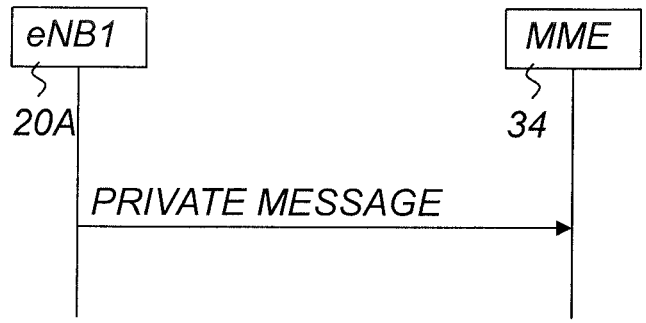
FIGS. 16A-B illustrate S1 private message procedures.

As illustrated in FIG. 16A, on request from a sending Ericsson S1AP entity, the node-eNB 20A the procedure sends a PRIVATE MESSAGE to the peer node, i.e. the MME 34. The eNB 20A initiating the procedure shall include the S1AP-Ericsson-PDU IE in the PRIVATE MESSAGE. The receiving node, i.e. the MME 34, forwards the Ericsson S1AP PDU to the receiving Ericsson S1AP entity.

Figure 16B:

Similarly, as illustrated in FIG. 16B, on request from sending Ericsson S1AP entity, the MME 34, the procedure sends the PRIVATE MESSAGE to the peer node, i.e. the eNB 20B. The MME 34 initiating the procedure shall include the S1AP-Ericsson-PDU IE in the PRIVATE MESSAGE. The receiving node, i.e. the eNB 20B, forwards the Ericsson S1AP PDU to the receiving Ericsson S1AP entity.

Figure 17A:
FIGS. 17A-B illustrate S1-based sharing of UE state estimations.
Figure 17B:

FIGS. 17A and 17B illustrate the possibility to use the private message for sharing of UE state estimations. The source eNB 31 initiating the sharing procedure shall include the X2AP-Ericsson-PDU IE that contain at least mandatory UE state estimation information, as described above, in the private message. The receiving MME 34 extracts the UE state estimation information from the private message, and includes it in a forwarding X2AP-Ericsson-PDU IE. This forwarded X2AP-Ericsson-PDU IE is provided to the target eNB 32, typically the new serving eNB, where the UE state estimation information is extracted and used.

In one embodiment, with reference to FIG. 7, the transmission is to be performed between two base stations via a core network node.

In one embodiment, with reference to FIG. 8, the at least one of UE kinematic state estimate information and UE type state estimate information is received from a base station in a base station via a core network node.

NR Xn HandOver

Similarly, in NR there are also private messages between base stations. This is denoted as an Xn interface, which can be between two gNBs, or gNB and ng-eNB.

Therefore, in analogy with the above description, in NR the sharing of the UE state estimates can be handled by using private message in Xn interface. The UE kinematic state estimate information and UE type state estimate information shall then be attached to the PrivateIE-container that belongs to the private message in the Xn interface.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a network node configured for sharing UE state estimates within a wireless communication network. The network node is configured to initiate transmission of at least one of obtained UE kinematic state estimate information and obtained UE type state estimate information to a receiving network node as a response to an obtained indication of a need for sharing UE state estimates. The obtained UE kinematic state estimate information comprises a latest kinematic state update time. The obtained UE kinematic state estimate information further comprises mode state vector estimates, mode covariance matrices and mode probabilities valid for the latest kinematic state update time for at least one UE kinematic mode. The obtained UE type state estimate information comprises a latest type state update time. The obtained UE type state estimate information further comprises a type state probability estimate valid for the latest type state update time.

Figure 18:
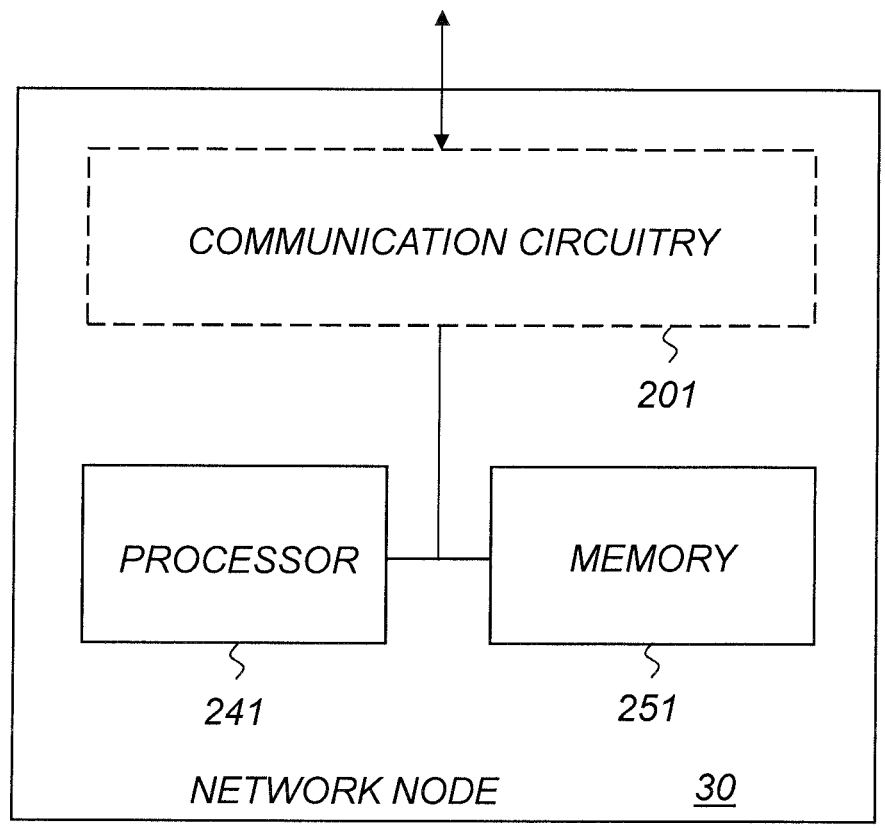
FIG. 18 is a schematic block diagram illustrating an embodiment of a network node.

FIG. 18 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to initiate transmission of at least one of obtained UE kinematic state estimate information and obtained UE type state estimate information to a receiving network node as a response to an obtained indication of a need for sharing UE state estimates.

The network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

In one embodiment, the network node is configured to initiate transmission of obtained UE kinematic state estimate information.

In a further embodiment, the network node is further configured to perform a UE kinematic state estimation, giving the mode state vector estimates, the mode covariance matrices, and the mode probabilities.

In one embodiment, the obtained UE kinematic state estimate information further comprises tracking coordinate system parameters.

In one embodiment, the obtained UE kinematic state estimate information further comprises system noise covariance matrices for each of the at least one UE kinematic mode.

In one embodiment, the obtained UE kinematic state estimate information further comprises measurement noise covariance matrices for each of the at least one UE kinematic mode.

In another embodiment, the network node is configured to initiate transmission of obtained UE type state estimate information.

In a further embodiment, the network node is further configured to perform a UE type state estimation, giving the type state probability estimate.

In one embodiment, the type state probability estimate comprises a probability estimate for the UE being a drone.

In one embodiment, the obtained UE type state estimate information further comprises a probability estimate for the UE not being a drone.

In one embodiment, the obtained UE type state estimate information further comprises parameters of discrimination features for the UE type state estimation.

In one embodiment, the indication of a need for sharing UE state estimates is a handover request.

In one embodiment, the transmission is to be performed via a private message.

In one embodiment, the transmission is to be performed to a base station.

In one embodiment, the network node is a base station.

In one embodiment, the transmission is to be performed between two base stations via a core network node.

According to another aspect of the proposed technology there is provided a network node configured for sharing UE state estimates within a wireless communication network. The network node is configured to receive at least one of UE kinematic state estimate information and UE type state estimate information from a sending network node as a response to an indication of a need for sharing UE state estimates. The UE kinematic state estimate information comprises a latest kinematic state update time. The UE kinematic state estimate information further comprises mode state vector estimates, mode covariance matrices and mode probabilities valid for the latest kinematic state update time for at least one UE kinematic mode. The UE type state estimate information comprises a latest type state update time. The UE type state estimate information further comprises a type state probability estimate valid for the latest type state update time.

The network node is further configured to propagate the UE kinematic state estimate and/or the UE type state estimate to a present time based on the UE kinematic state estimate information or the UE type state estimate information, respectively.

FIG. 18 can also be considered as a schematic block diagram illustrating an example of such a network node 30, based on a processor-memory implementation according to an embodiment. Thereby the processor 241 is operative to propagate the UE kinematic state estimate and/or the UE type state estimate to a present time based on the UE kinematic state estimate information and/or the UE type state estimate information, respectively.

As mentioned before, the network node 30 may also include a communication circuitry 201. The communication circuit 209 is operative to receive the UE kinematic state estimate information and/or the UE type state estimate information.

In one embodiment, the network node is configured to receive UE kinematic state estimate information.

In a further embodiment, the network node is further configured to perform a UE kinematic state estimation, based on the mode state vector estimates, the mode covariance matrices, and the mode probabilities, propagated to a present time based on the latest kinematic state update time.

In one embodiment, the received UE kinematic state estimate information further comprises tracking coordinate system parameters.

In one embodiment, the received UE kinematic state estimate information further comprises system noise covariance matrices for each of the at least one UE kinematic mode.

In one embodiment, the received UE kinematic state estimate information further comprises measurement noise covariance matrices for each of the at least one UE kinematic mode.

In another embodiment, the network node is configured to receive UE type state estimate information.

In a further embodiment, the network node is further configured to perform a UE type state estimation, based on the type state probability estimate, propagated to a present time based on the latest type state update time.

In one embodiment, the type state probability estimate comprises a probability estimate for the UE being a drone.

In one embodiment, the UE type state estimate information further comprises a probability estimate for the UE not being a drone.

In one embodiment, the UE type state estimate information further comprises parameters of discrimination features for the UE type state estimation.

In one embodiment, the indication of a need for sharing UE state estimates is a handover request.

In one embodiment, the receiving is performed via a private message.

In one embodiment, the network node is a base station.

In one embodiment, the UE kinematic state estimate information and/or the UE type state estimate information is received from a base station.

In one embodiment, the UE kinematic state estimate information and/or the UE type state estimate information is received from a base station via a core network node.

Figure 19:
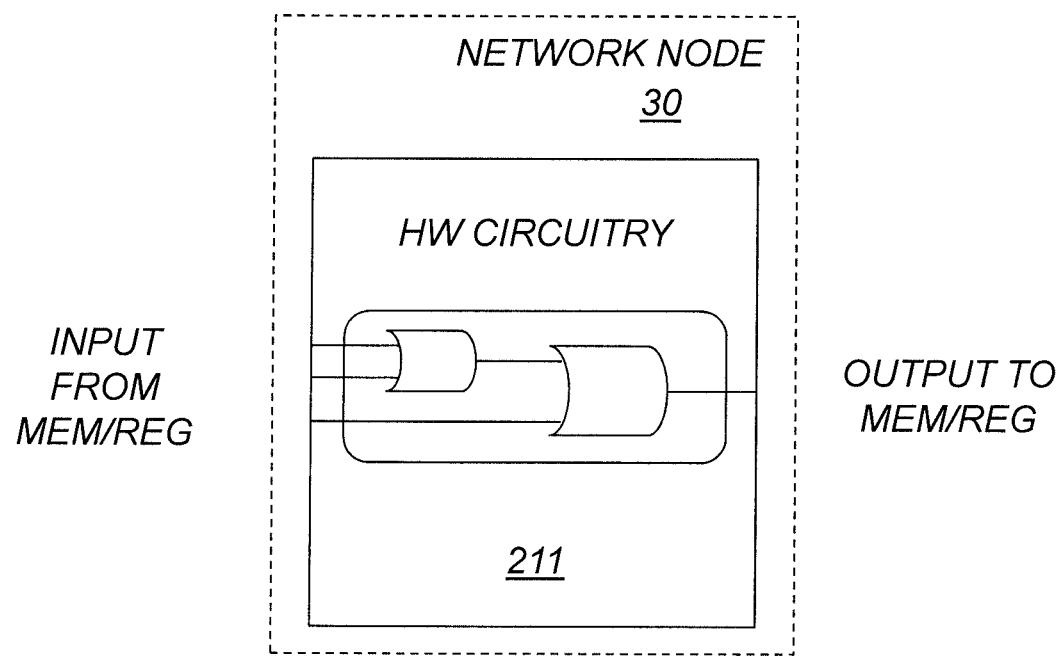
FIG. 19 is a schematic block diagram illustrating an embodiment of a network node based on a hardware circuitry implementation.

FIG. 19 is a schematic block diagram illustrating another example of a network node 30, based on a hardware circuitry implementation according to 20 an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 20:
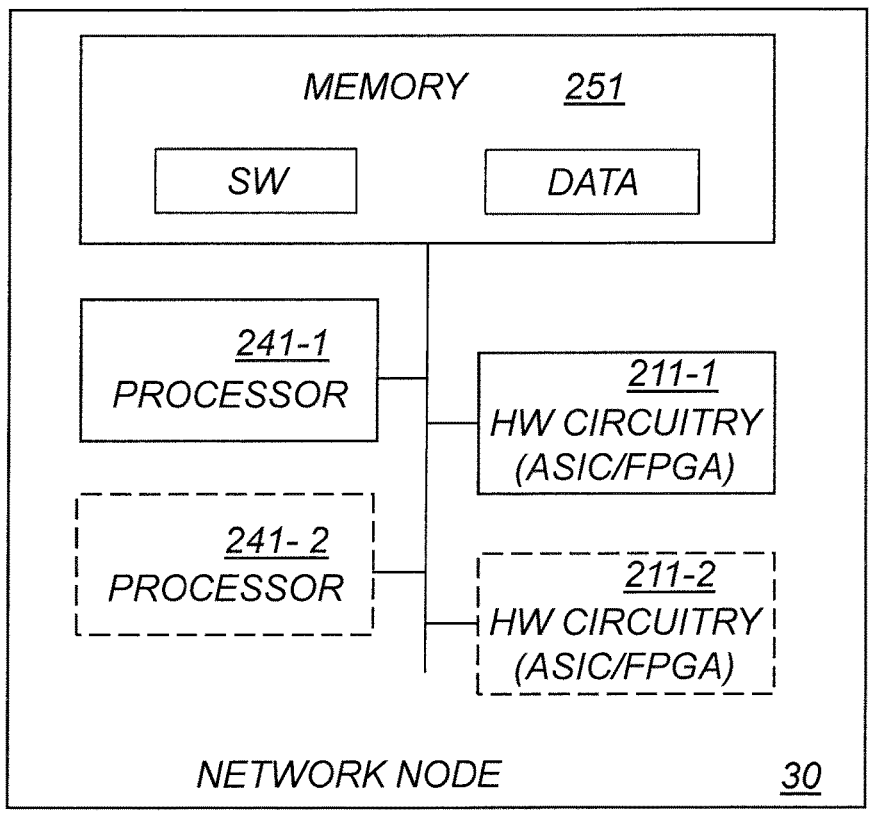
FIG. 20 is a schematic block diagram illustrating another embodiment of a network node based on combination of both processor and hardware circuitry.

FIG. 20 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 21:
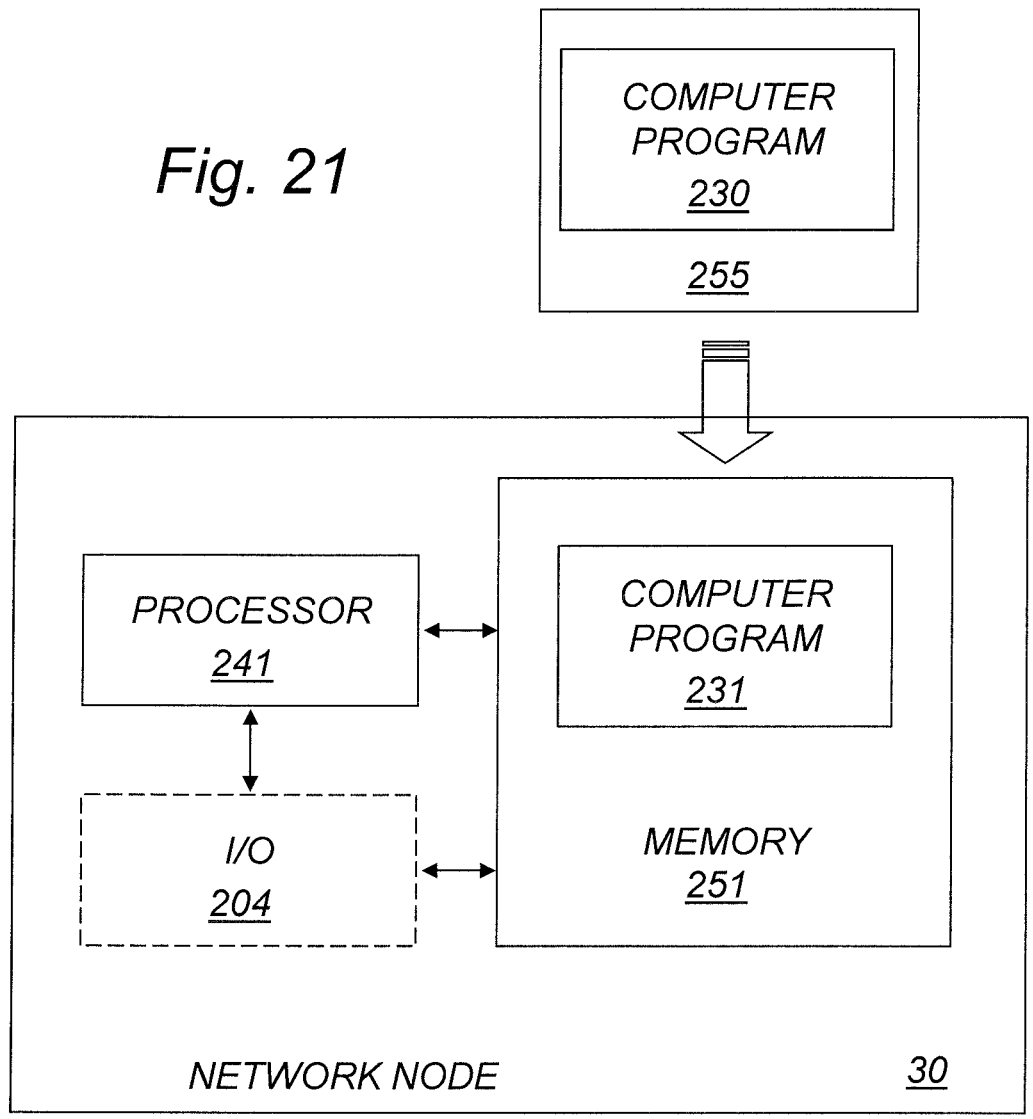
FIG. 21 is a schematic diagram illustrating an embodiment of a computer-implementation of a network node.

FIG. 21 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to initiate transmission of at least one of obtained UE kinematic state estimate information and obtained UE type state estimate information to a receiving network node as a response to an obtained indication of a need for sharing UE state estimates. The obtained UE kinematic state estimate information comprises a latest kinematic state update time. The obtained UE kinematic state estimate information further comprises mode state vector estimates, mode covariance matrices and mode probabilities valid for the latest kinematic state update time for at least one UE kinematic mode. The obtained UE type state estimate information comprises a latest type state update time.

The obtained UE type state estimate information further comprises type state probability estimate valid for the latest type state update time.

In another particular embodiment, the computer program 239 comprises instructions, which when executed by at least one processor 248, cause the processor(s) 248 to receive at least one of UE kinematic state estimate information and UE type state estimate information from a sending network node as a response to an indication of a need for sharing UE state estimates. The UE kinematic state estimate information comprises a latest kinematic state update time. The UE kinematic state estimate information further comprises mode state vector estimates, mode covariance matrices and mode probabilities valid for the latest kinematic state update time for at least one UE kinematic mode. The UE type state estimate information comprises a latest type state update time. The UE type state estimate information further comprises type state probability estimate valid for the latest type state update time. The instructions, when executed by the processor(s), further cause the processor(s) to propagate the UE kinematic state estimate and/or the UE type state estimate to a present time based on the UE kinematic state estimate information and/or the UE type state estimate information, respectively.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

In one aspect, the presented technology discloses a computer-program product comprising a computer-readable medium having stored thereon a computer program according to the above description.

Figure 22:
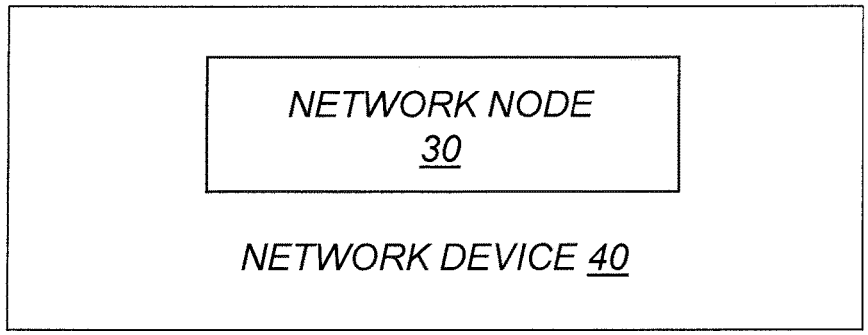
FIG. 22 is a schematic block diagram illustrating an embodiment of a network device.

FIG. 22 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 23:
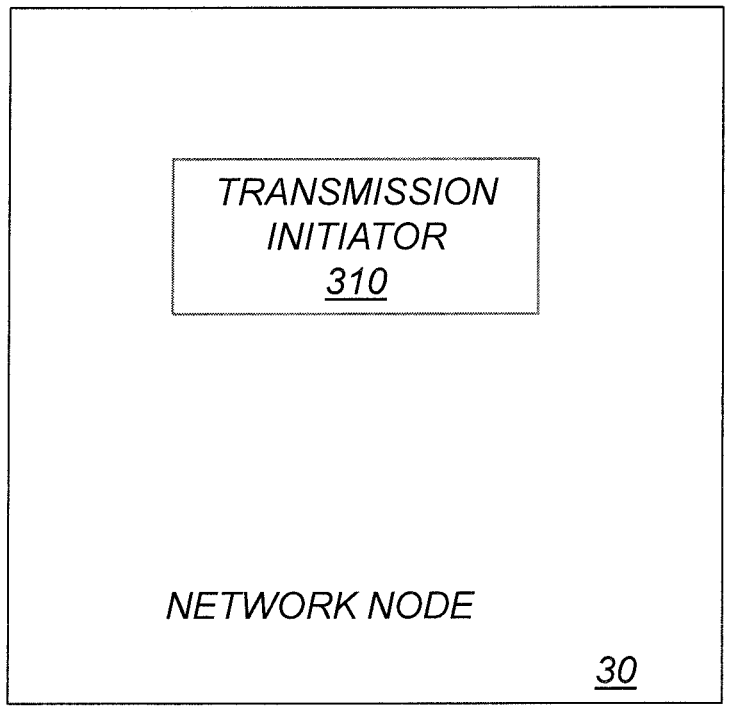
FIG. 23 is a schematic diagram illustrating an embodiment of a network node.

FIG. 23 is a schematic diagram illustrating an example of a network node 30 for sharing UE state estimates between nodes within a wireless communication network. The network node 30 comprises a transmission initiator 310 for initiating transmission of at least one of obtained UE kinematic state estimate information and obtained UE type state estimate information to a receiving network node as a response to an obtained indication of a need for sharing UE state estimates. The obtained UE kinematic state estimate information comprises a latest kinematic state update time. The obtained UE kinematic state estimate information also comprises mode state vector estimates, mode covariance matrices and mode probabilities valid for the latest kinematic state update time for at least one UE kinematic mode. The obtained UE type state estimate information comprises a latest type state update time. The obtained UE type state estimate information also comprises a type state probability estimate valid for the latest type state update time.

Figure 24:
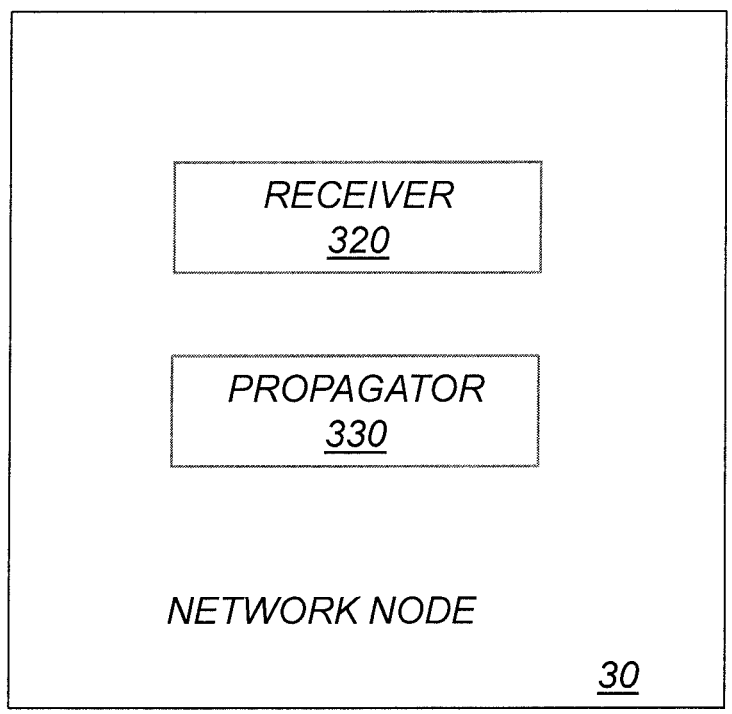
FIG. 24 is a schematic diagram illustrating an embodiment of another network node.

FIG. 24 is a schematic diagram illustrating an example of a network node 30 for sharing UE state estimates between nodes in a wireless communication network. The network node 30 comprises a receiver 320, for receiving at least one of UE kinematic state estimate information and UE type state estimate information from a sending network node as a response to an indication of a need for sharing UE state estimates. The received UE kinematic state estimate information comprises a latest kinematic state update time. The received UE kinematic state estimate information also comprises mode state vector estimates, mode covariance matrices and mode probabilities valid for the latest kinematic state update time for at least one UE kinematic mode. The received UE type state estimate information comprises a latest type state update time. The received UE type state estimate also information comprises type state probability estimate valid for the latest type state update time. The network node 30 also comprises a propagator 330, for propagating the UE kinematic state estimate and/or the UE type state estimate to a present time based on the UE kinematic state estimate information and/or the UE type state estimate information, respectively.

Alternatively it is possible to realize the module(s) in FIGS. 23 and 24 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 25:
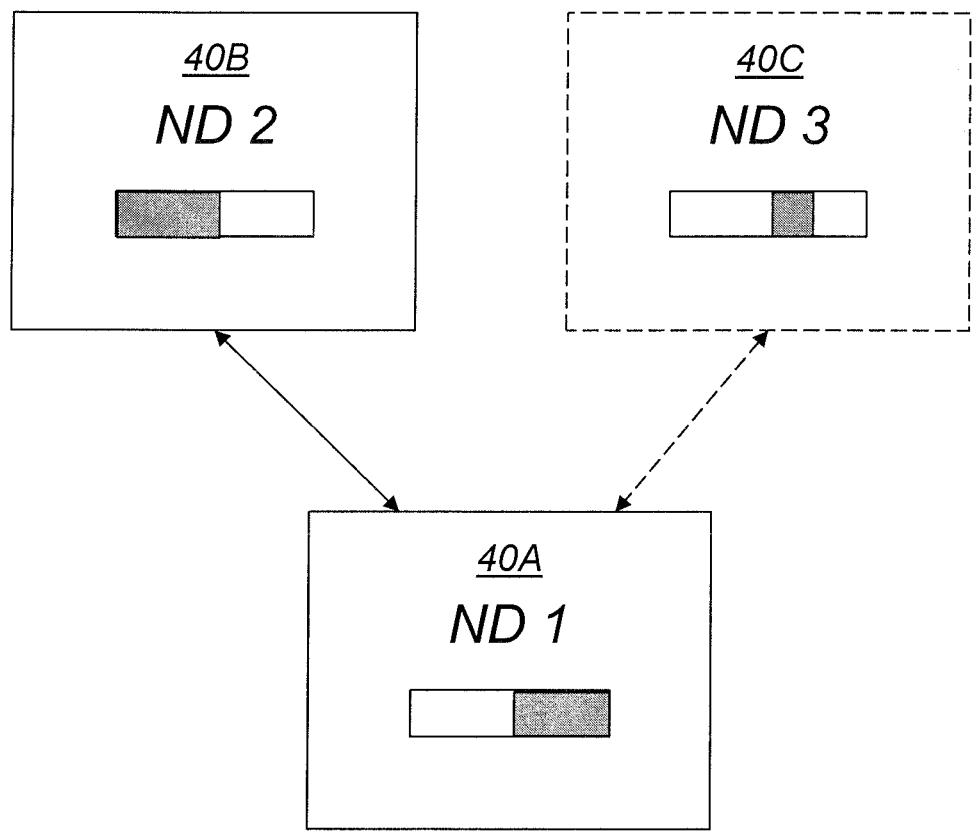
FIG. 25 is a schematic diagram illustrating a general example of functionality distribution or partition.

FIG. 25 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 26:
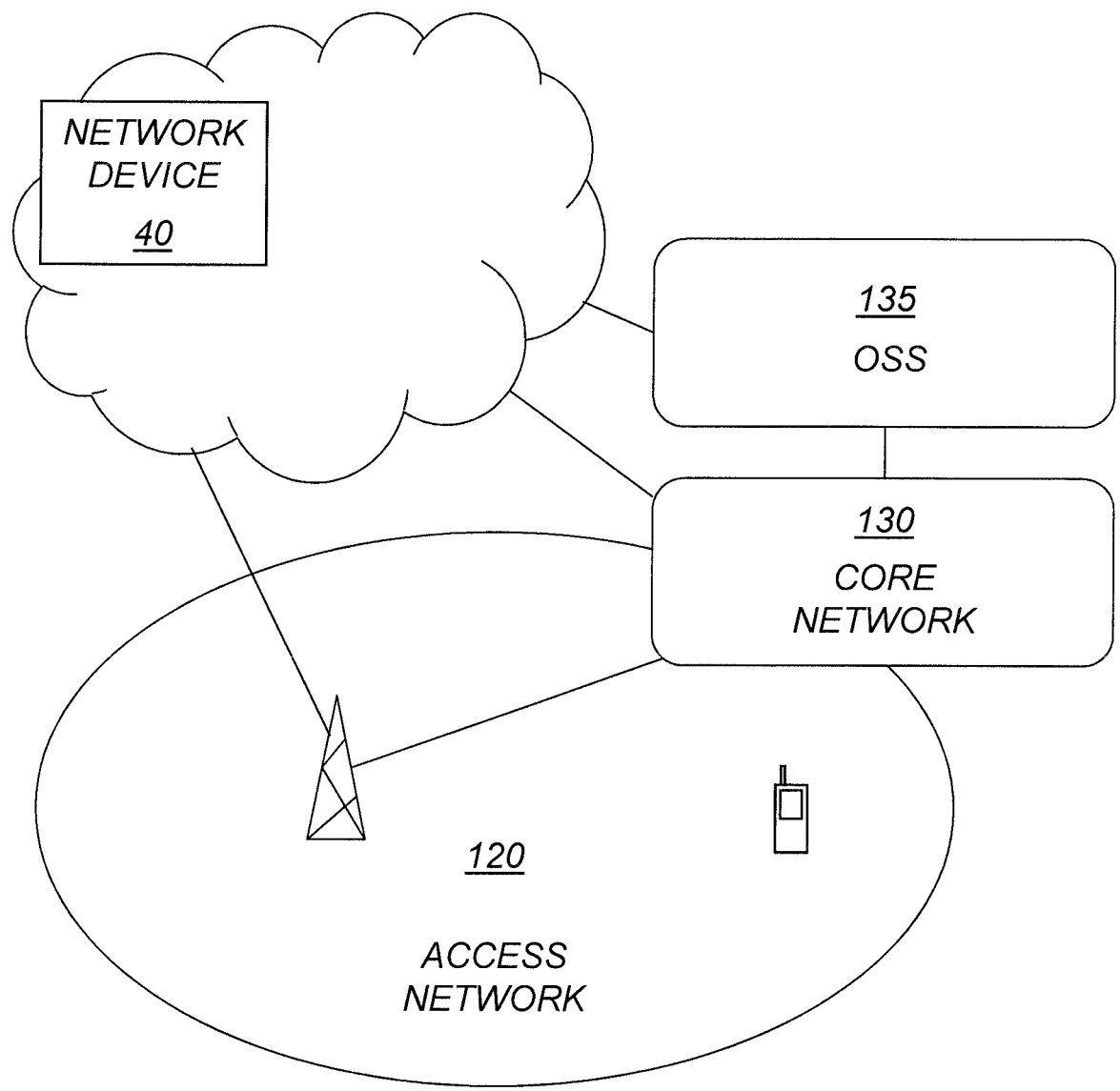
FIG. 26 is a schematic diagram illustrating an example of a wireless communication system in cooperation with one or more cloud-based network devices.

FIG. 26 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

The technology to the problem disclosed in the present disclosure relies on a number of components, that are further discussed above and below. There is preferably a novel high accuracy range information based on high accuracy round trip time measurements, with respect to multiple base stations. There is furthermore preferably novel drone movement modeling methods. There is furthermore, preferably novel drone state estimation algorithms, fusing range measurements and movement model information. There is furthermore preferably, a novel drone detection, using new Bayesian processing of estimated rogue drone states. Finally, there is a novel signaling of rogue drone identities and types, for interference mitigation and/or flight restriction.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX A

Figure 2:
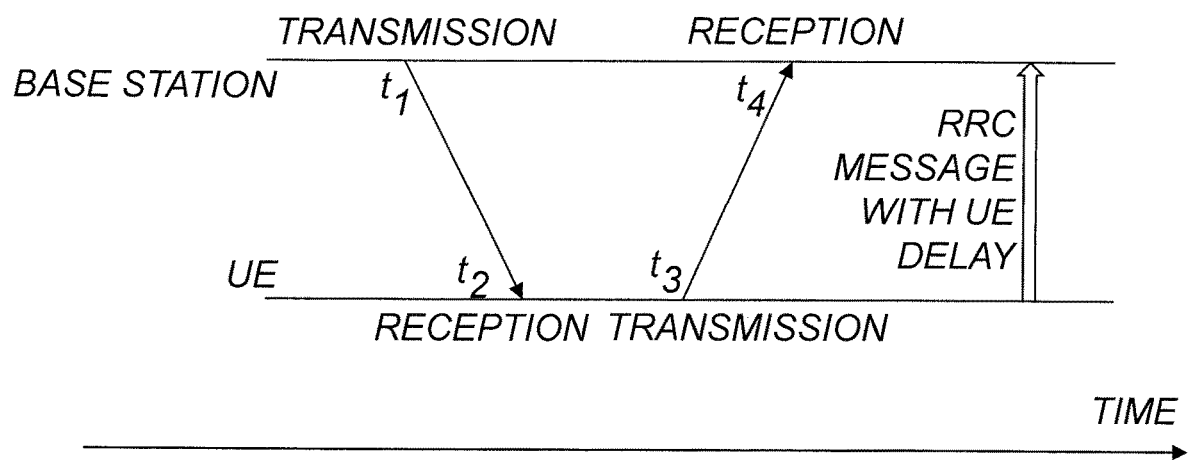
FIG. 2 is an illustration of a round trip time measurement.

A round-trip-time (RTT) measurement measures the travel time of radio waves from a base station to a UE and back. Given the round trip time measurement, RTT, the range follows as:

$$R = c\frac{RTT}{2}, \quad (A1)$$

where c denotes the speed of light. The principle of the RTT measurement is illustrated in FIG. 2. A base station transmits a signal at a time instant $t_1$. The signal propagates to the UE, which receives the signal at a time instant $t_2$. The UE replies with a reply signal, which is transmitted at a time instant $t_3$. The reply signal is received in the base station at a time instant $t_4$. The UE keeps track on the delay, UE RxTx, between the reception of the first signal and the transmission of the reply signal and signals this delay time to the base station, typically in a radio resource protocol (RRC) message. The UE RxTx is measured in the UE as:

$$UE\ RxTx = t_3 - t_2 \quad (A2)$$

At the base station side, the true RTT time can then be obtained as:

$$RTT = t_4 - t_1 - UE\ RxTx. \quad (A3)$$

It can be noted that the main contribution of the inaccuracy of the measurement originates from the two reception processes in the UE and the base station. The theoretical inaccuracy of one such measurement is, in free space propagation, inversely proportional to the measurement bandwidth, as:

$$\Delta t \geq \frac{1}{4\pi}\frac{1}{\Delta f}. \quad (A4)$$

This means that in case the measurement bandwidth is for example 30 MHz, then the best time inaccuracy that is possible is 2.65 ns which corresponds to a little less than 1 m, corresponding to a 1 sigma value. Since two independent measurement processes are used for RTT a 40 MHz measurement bandwidth would result in a combined RTT measurement inaccuracy of about 1 m.

APPENDIX B

Figure 3:
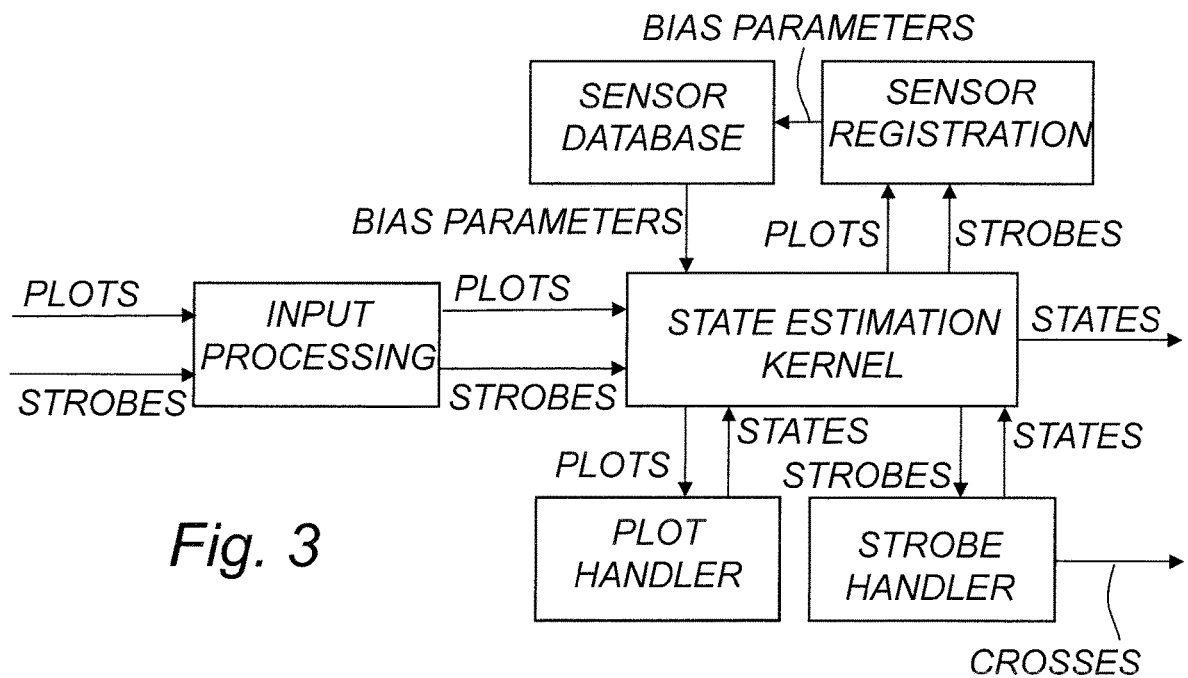
FIG. 3 is an example of a typical object state estimation system.

One example block-diagram of a so-called multi-sensor state estimation system is depicted in FIG. 3.

The operation of this particular system can be briefly explained as follows. Measurements consisting of strobes and plots are first collected from the sensors attached to the moving object estimation system. Strobes are angle-only measurements and plots are Cartesian position measurements. The plots and strobes are sent to an input processing unit for association with existing three-dimensional state estimates. Association is the process of determining which measurements that belong to each state estimate.

The association is performed in the measurement space of each sensor, i.e. the state estimates, which typically reside in an earth tangential Cartesian coordinate system, are transformed to the measurement space of each sensor. Associated data then update state estimates in a state estimation kernel, typically with Kalman filtering techniques, as discussed further below. Plots and strobes that are not associated may originate from new objects and they are sent to the plot handler or the strobe handler for initiation of new state estimates. Crosses are pairs of strobes tentatively associated with new objects. Plots and strobes that are associated to high quality estimates are also used for computation of sensor bias parameters in the sensor registration block.

If such a state estimation technique is implemented in a wireless communication system, the input measurements may be of a range-only character. In other words, the distance to the object of the state estimation from a sensor is measured, but the direction is basically unknown.

Furthermore, some simplifications may be implemented. In a wireless communication system, each UE has a unique ID when attached to the cellular system. This means that the above described association process is not needed. Moreover, the advanced state initiation is not generally needed in the wireless communication system, but the known techniques may be combined with the technology presented here for further enhancement. Finally, the sensor registration described above is typically not needed in the present implementation. However, the known techniques may be combined with the current ideas for further enhancement.

APPENDIX C

There are many known methods for estimation when multiple dynamic modes describe the behavior of an object, whose state is estimated.

A first and most general way of performing such estimation would be to depend on the joint probability distribution of the objects state. The propagation of this state forward in time is known in prior art to be governed by the so-called Fokker-Planck partial differential equation. The measurement processing is performed by a multi-dimensional integration, to obtain the posterior probability state distribution from the likelihood of the measurement and the prior probability distribution. This process is known under the name Bayesian inference. It is, however, immensely more computationally complex and memory intensive than the solution disclosed further below. In passing it can be mentioned that Bayesian inference is today approximated by so-called particle filters, in which the probability density functions are discretized in terms of individual "particles". Since particle filtering is still immensely more complex than the disclosed solution, the details are not discussed further in detail here.

At the other complexity extreme, each mode can be modeled separately and also estimated separately. Then ad hoc logic may be used to select the movement mode. Traditional state estimation for e.g. air vehicles was designed in that way. One movement mode was assumed to be constant velocity movement, i.e. straight line movement, and the other movement mode was a maneuver mode, modeled by a leaky constant velocity movement that responded to measurements with much higher agility than the constant velocity mode. Finally, a maneuver detector was used to choose the maneuver filter in case that was deemed to match measurements better. After the maneuver was terminated a re-initialized constant velocity movement mode was used for state estimation. This approach was robust but suffered from difficulties in the selection of threshold values for the maneuver detector.

A more systematic approach to the state estimation problem at hand is offered by the interacting-multiple-model (IMM) filter that was discovered about 30 years ago.

The IMM algorithm assumes that the system behaves according to one of a finite number of models which is one of several modes. These models can differ in noise levels or their structure, such as different state dimensions and unknown inputs. In the IMM approach, at time k the state estimate is computed under each possible model using r filters, with each filter using a different combination of the previous model-conditioned estimates–mixed initial conditions.

Figure 4:
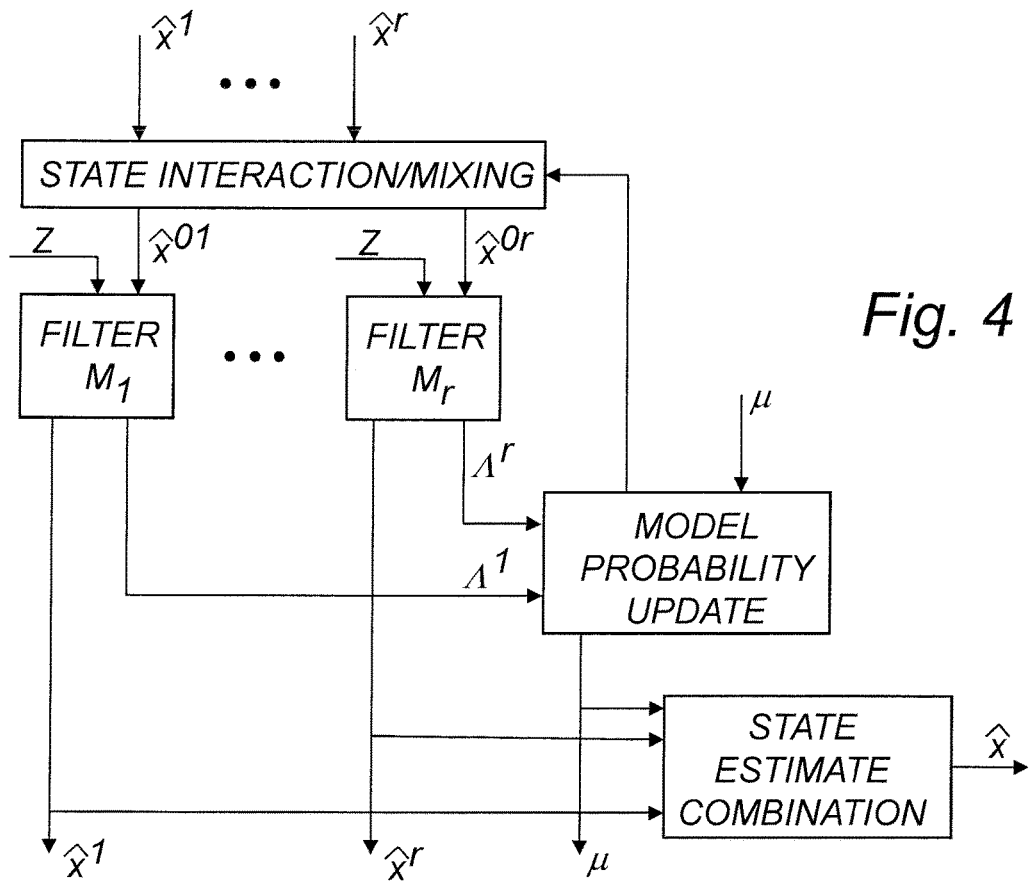
FIG. 4 is a block diagram of an interacting-multiple-model algorithm.

FIG. 4 describes one cycle of the typical IMM algorithm, which consists of r interacting filters operating in parallel. The IMM algorithm is described more in detail in Appendix D.

To set up an IMM filter, three main choices needed to be made. First, the movement modes have to be defined. Secondly, the transition probabilities between the movement modes have to be defined. Finally, the initial conditions of the filters have to be selected.

For each movement mode, this amount to the definition of a state space model, i.e., one vector difference equation that defines the dynamics, and another static vector equation that defines the measurement relation, by mapping states to the measurements. In addition, the inaccuracies of the measurement equation and the dynamic state model needs to be given in terms of the covariance matrices of the uncertainties.

The second choice describes, in terms of a hidden Markov model, how the modes interact, this being expressed in terms of the probabilities of a mode transition of the estimated object, between two discrete instances of time.

The third choice is typically made in terms of the expected initial state and covariance of each model.

All these choices are typically specific for the actual implementation of the IMM and are thus more or less unique for each new implementation.

For each filter $M_j$, j=1, . . . , r, a nonlinear Extended Kalman filter (EKF) is typically used. EKF is based on linear approximations of the nonlinear system. It can be used to estimate the state of a discrete-time dynamic system described by a vector difference equation with additive white Gaussian noise that models unpredictable disturbances.

Figure 5:
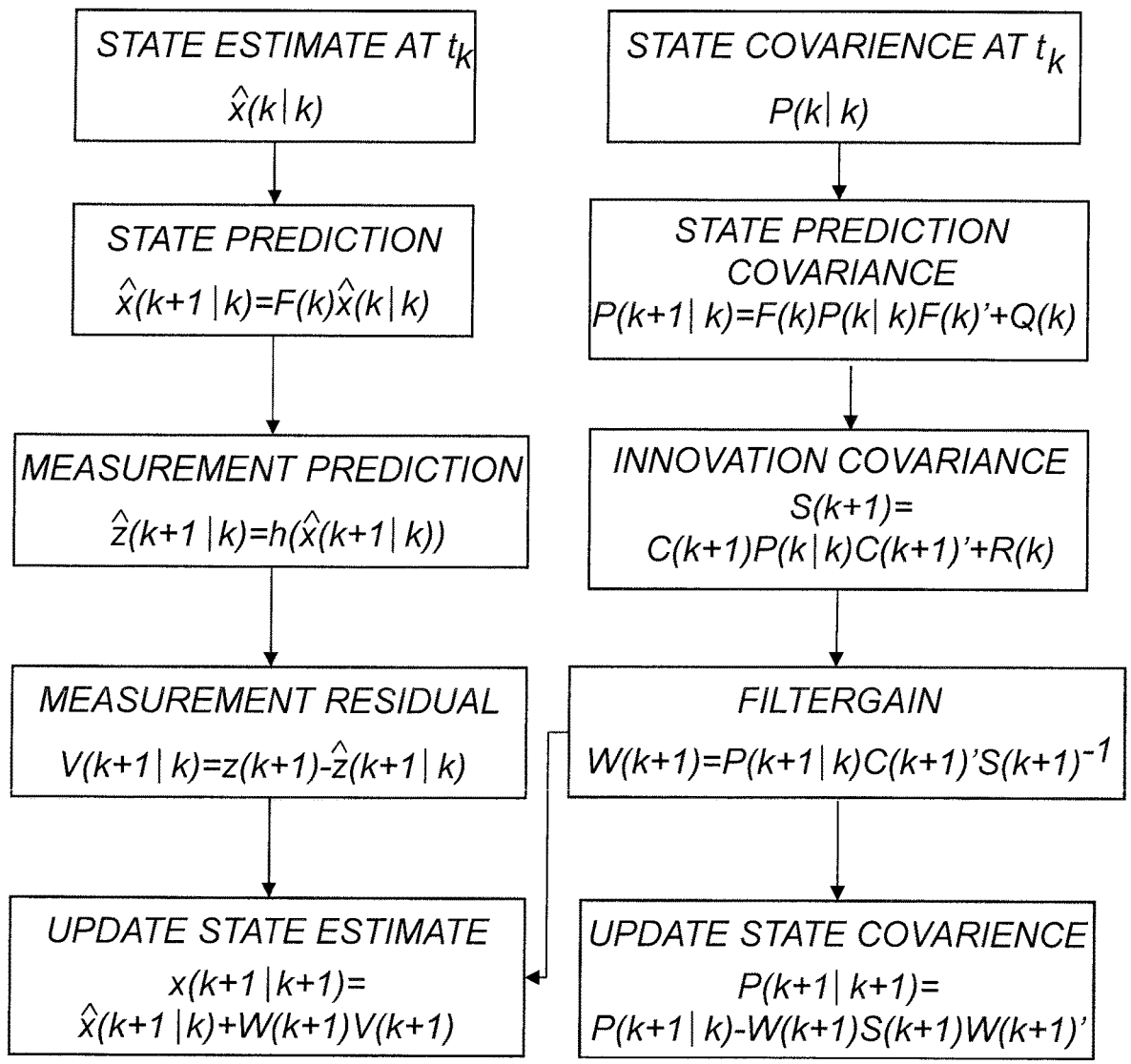
FIG. 5 is a flow diagram of an example of one cycle of a state estimation.

A flowchart of a typical EKF filter is shown in FIG. 5, and the EKF is described more in detail in Appendix E.

APPENDIX D

FIG. 4 describes one cycle of the typical IMM algorithm, which consists of r interacting filters operating in parallel. The mixing is done at the input of the filters, at the state interaction/mixing unit, with the probabilities, conditioned on data $Z^{k-1}$. The structure of the IMM algorithm is:

$$(N_e; N_f) = (r; r), \qquad (D1)$$

where $N_e$ is the number of estimates at the start of the cycle of the algorithm and $N_f$ is the number of filters in the algorithm.

One cycle of the algorithm consists of the following. Mixing probabilities (i,j=1, . . . , r) are calculated. The probability that mode $M_i$ was in effect at time k−1 given that $M_j$ is in effect at k conditioned on $Z^{k-1}$ is:

$$\mu_{i|j} = \frac{1}{\bar{c}_j} p_{ij}\mu_i(k-1), \qquad (D2)$$

where the normalizing constants are given by the below equation. This equation uses the mode transition probabilities $p_{ij}$ which is the respective probability that the estimated object is in mode j at time k, conditioned on being in mode i at time k−1. The expression for the normalizing constant is:

$$\bar{c}_j = \sum_{i=1}^{r} p_{ij}\mu_i(k-1). \qquad (D3)$$

Next, mixing is performed for (j=1, . . . r). Starting with $\hat{x}^i(k-1|k-1)$ one components the mixed initial condition for the filter matched to $M_j(k)$ as:

$$\hat{x}^{0j}(k-1|k-1) = \sum_{i=1}^{r} \hat{x}^i(k-1|k-1)\mu_{i|j}(k-1|k-1) \qquad (D4)$$

$$j = 1, ..., r.$$

The covariance corresponding to the above is:

$$P^{0j}(k-1|k-1) = \qquad (D5)$$

$$\sum_{i=1}^{r} \mu_{i|j}(k-1|k-1)\{P^i(k-1|k-1) + [\hat{x}^i(k-1|k-1) - $$

$$\hat{x}^{0j}(k-1|k-1)] \cdot [\hat{x}^i(k-1|k-1) - \hat{x}^{0j}(k-1|k-1)]'\},$$

with ' denoting the transpose.

Next, mode-matched filtering is performed for (j=1, . . . r). The estimate and the covariance obtained in eq. (5) are used as input to the filter matched to $M_j(k)$, which uses z(k) to yield $\hat{x}^j(k|k)$ and $P^j(k|k)$.

The likelihood function corresponding to the r filters:

$$\Lambda_j(k) = p[z(k) | M_j(k), Z^{k-1}] \quad (D6)$$

are computed using the mixed initial condition and the associated covariance as:

$$\Lambda_j(k) = p[z(k) | M_j(k), \hat{x}^{0j}(k-1|k-1) P^{0j}(k-1|k-1)] \ j = 1, \ldots, r. \quad (D7)$$

Model probability update is performed for (j=1, ..., r). This is done as follows:

$$\mu_j(k) = \frac{1}{c} \Lambda_j(k) \bar{c}_j \ j = 1, \ldots, r, \quad (D8)$$

where $\bar{c}_j$ is given above and $$c = \sum_{j=1}^{r} \Lambda_j(k) \bar{c}_j \quad (D9)$$

is the normalization factor.

Estimate and covariance combination is performed. Combination of the model-conditioned estimates covariances is done according to the mixture equations:

$$\hat{x}(k|k) = \sum_{j=1}^{r} \hat{x}^j(k|k) \mu_j(k) \quad (D10)$$

$$P(k|k) = \sum_{j=1}^{r} \mu_j(k) \{ P^j(k|k) + [\hat{x}^j(k|k) - \hat{x}(k|k)][\hat{x}^j(k|k) - \hat{x}(k|k)]' \}.$$

APPENDIX E

The dynamic model of the EKF is:

$$x(k+1) = F(k)x(k) + v(k), \quad (E1)$$

where $x(k)$ is the $n_x$-dimensional state vector, and $v(k)$, $k=0, 1, \ldots$ is the sequence of zero-mean white Gaussian process noise (also $n_x$ vectors) with covariance:

$$\mathbb{E}[v(k)v(k)'] = Q(k). \quad (E2)$$

The measurement equation is:

$$z(k) = h(x(k), k) + w(k) \ k = 1, \ldots \quad (E3)$$

with h(.) being a nonlinear function of state and w(k) the sequence of zero-mean Gaussian measurement noise with covariance:

$$\mathbb{E}[w(k)w(k)'] = R(k). \quad (E4)$$

The matrices F, Q, R and the function h(.) are assumed to be known and possibly time varying. In other words, the system can be time varying and the noises nonstationary. The Jacobian of the measurement model h(x(k), k) with respect to k is defined as:

$$C(k) = \frac{\partial H(x(k), k)}{\partial x(k)}. \quad (E5)$$

The initial state x(0), in general unknown, is modeled as a random variable, Gaussian distributed with known mean and covariance. The two noise sequences and the initial state are assumed to be mutually independent. This constitutes the Linear-Gaussian (LG) assumption.

The conditional mean:

$$\hat{x}(j|k) = \mathbb{E}[x(j) | Z^k], \quad (E6)$$

where $Z^k = \{z(j), j \le k\}$ denotes the sequence of observations available at time k, is the estimate of the state if j=k and predicted value of the state if j>k. The conditional covariance matrix of x(j) given the data $Z^k$ or the covariance associated with the estimate is:

$$P(j|k) = \mathbb{E}[[x(j) - \hat{x}(j|k)][x(j) - \hat{x}(j|k)]' | Z^k]. \quad (E7)$$

The estimation algorithm starts with the initial estimate $\hat{x}(0|0)$ of x(0) and the associated initial covariance P(0|0), assumed to be available. The second (conditioning) index 0 stands for $Z^0$, the initial information.

One cycle of the dynamic estimation algorithm—the Extended Kalman filter (EKF)—will thus consist of the computations to obtain the estimate:

$$\hat{x}(k|k) = \mathbb{E}[x(k) | Z^k] \quad (E8)$$

which is the conditional mean of the state at time k (the current stage) given the observation up to and including time k, and the associated covariance matrix:

$$P(k|k) = \mathbb{E}[[x(k) - \hat{x}(k|k)][x(k) - \hat{x}(k|k)]' | Z^k]. \quad (E9)$$

It remains to describe the propagation to the next update time. This is obtained by the equations:

$$\hat{x}(k+1|k) = A\hat{x}(k|k) \quad (E10)$$

$$P(k+1|k) = AP(k|k)A^T + Q(k). \quad (E11)$$

APPENDIX F

The following 3-mode model is believed to constitute a new combination of movement modes, adapted to the hovering movement that drones are capable of. The three models are a 3D constant velocity movement Wiener process, a 3D constant acceleration movement Wiener process, and a 3D constant position Wiener process. The notation "constant" allows for minor fluctuations, so that the first model really concerns an almost constant velocity movement, the second model really concerns an almost constant acceleration movement and the third model really concerns an almost hovering constant position movement.

The continuous time state space constant velocity model is described using the states:

$$x(t) = \begin{bmatrix} x_1 \\ x_2 \\ x_3 \\ \dot{x}_1 \\ \dot{x}_2 \\ \dot{x}_3 \end{bmatrix}, \tag{F1}$$

where the subscript defines the Cartesian coordinate directions. The model is:

$$\dot{x}(t) = A_1 x(t) + B_1 \hat{v}(t), \tag{F2}$$

with $$A_1 = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 0 & 0 & 0 & 0 & 0 & 0 \\ 0 & 0 & 0 & 0 & 0 & 0 \\ 0 & 0 & 0 & 0 & 0 & 0 \end{bmatrix}, B_1 = \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}.$$

The process noise covariance matrix is:

$$Q_{c_1} = \text{diag}([q_{11} q_{12} q_{13}]), \tag{F4}$$

where $q_{11}$, $q_{12}$ and $q_{13}$ are the process noise variances.

The continuous time state space constant acceleration model is defined using the states:

$$x(t) = \begin{bmatrix} x_1 \\ x_2 \\ x_3 \\ \dot{x}_1 \\ \dot{x}_2 \\ \dot{x}_3 \\ \ddot{x}_1 \\ \ddot{x}_2 \\ \ddot{x}_3 \end{bmatrix}, \tag{F5}$$

where the subscript defines the Cartesian coordinate directions. The model is:

$$\dot{x}(t) = A_2 x(t) + B_2 \hat{v}(t) \tag{F6}$$

$$A_2 = \begin{bmatrix} 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \end{bmatrix}, B_2 = \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 1 & 0 & 0 \\ 0 & 1 & 0 \\ 0 & 0 & 1 \end{bmatrix}. \tag{F7}$$

The process noise covariance matrix is $Q_{c_2}$.

The continuous time state space constant position hovering model is defined by the states:

$$x(t) = \begin{bmatrix} x_1 \\ x_2 \\ x_3 \end{bmatrix}, \tag{F8}$$

where the subscript defines the Cartesian coordinate directions. The model is:

$$\dot{x}(t) = A_3 x(t) + B_3 \hat{v}(t) \tag{F9}$$

$$A_3 = \begin{bmatrix} 0 & 0 & 0 \\ 0 & 0 & 0 \\ 0 & 0 & 0 \end{bmatrix}, B_3 = \begin{bmatrix} 1 & 0 & 0 \\ 0 & 1 & 0 \\ 0 & 0 & 0.001 \end{bmatrix}. \tag{F10}$$

The process noise covariance is $Q_{c_3}$.

Another aspect of the preferred IMM filtering process, is related to the physics of the drone movement. When the drone is in constant velocity movement, it cannot stop immediately, it rather brakes. This means that the sequence of mode transitions is from mode 1, over mode 2, to mode 3. The direct mode transmission from mode 1 to mode 3 is forbidden. This is reflected by new constraints in the mode transition probability matrix of the IMM filter, namely in:

$$p_{ij} = \begin{bmatrix} p_{11} & p_{12} & p_{13} \\ p_{21} & p_{22} & p_{23} \\ p_{31} & p_{32} & p_{33} \end{bmatrix}. \tag{F11}$$

The new restrictions are selected as the following ones:

$$p_{13} \le \varepsilon_{13}, p_{31} \le \varepsilon_{31}. \tag{F12}$$

Here $\varepsilon_{13}$ and $\varepsilon_{31}$ are both much smaller than 1.

A nonlinear range measurement model may be used, based on a RTT measurement. The RTT based range measurement model is:

$$h(\hat{x}(t)) = \frac{2\sqrt{(\hat{x}_1(k) - x_{S,1}(k))^2 + (\hat{x}_2(k) - x_{S,2}(k))^2 + (\hat{x}_3(k) - x_{S,3}(k))^2}}{c},$$

(F13)

where $x_s(.)$ denotes the site position and the constant c is the speed of the light. The derivative of the measurement model is defined as:

$$\frac{\partial h(\hat{x})(k)}{\partial \hat{x}} = \begin{pmatrix} \frac{2(\hat{x}_1(k) - x_{S,1}(k))}{c\sqrt{(\hat{x}_1(k) - x_{S,1}(k))^2 + (\hat{x}_2(k) - x_{S,2}(k))^2 + (\hat{x}_3(k) - x_{S,3}(k))^2}} \\ \frac{2(\hat{x}_2(k) - x_{S,2}(k))}{c\sqrt{(\hat{x}_1(k) - x_{S,1}(k))^2 + (\hat{x}_2(k) - x_{S,2}(k))^2 + (\hat{x}_3(k) - x_{S,3}(k))^2}} \\ \frac{2(\hat{x}_3(k) - x_{S,3}(k))}{c\sqrt{(\hat{x}_1(k) - x_{S,1}(k))^2 + (\hat{x}_2(k) - x_{S,2}(k))^2 + (\hat{x}_3(k) - x_{S,3}(k))^2}} \end{pmatrix}'.$$

(F14)

In this example it is assumed that the measurement is done with respect to one site, at the time of update. In an application, multiple measurements would appear as new rows. Note also that the Jacobian as given here is for the hovering mode. Obvious modifications appear for the constant velocity and constant acceleration models.

APPENDIX G

Models for calculation of the altitude above mean sea level of the ground will be useful to define the technology. A first example of such a system would be a complete geographical information system (GIS) that consist of ground altitude maps covering the region of the cellular system. A second example would be to use a configured ground altitude, for each antenna site of the cellular system. A third example would be to use a model of the ground altitude, valid in the interior of each cell of the cellular system, obtained by the method of [1] T. Wigren, "Wireless hybrid positioning based on surface modeling with polygon support", Proc. VTC 2018 Spring, Porto, Portugal, June, 2018.

APPENDIX H

When Bayesian methods are used for detection of a rogue drone, the probability of each type or set of types of objects are estimated, based on a set of features. Kinematic capabilities can be exploited. However, such features are usually based on hard tabulated information without uncertainty, which is a problem of the present field of technology.

In a preferred case, two UE types are thus distinguished, namely a drone UE and a "terrestrial" UE. The latter is referred to as 'not drone'. In the mathematical description below, these are denoted as D and ¬D, respectively. The first state is thus selected to be $P(D|z^t) \propto P(z^t|D)P(D)$, i.e. the probability of a drone, conditioned on the measurements. Analogously, the second state is selected to be $P(\neg D|z^t) \propto P(z^t|\neg D)P(\neg D)$–, i.e. the probability of not being a drone, conditioned on the measurements. Here $\propto$ Means "is proportional to".

In the first transformation of these states, Bayes rule is used to decompose the states into a likelihood of the measurement set $z^t$, multiplied with the prior probability.

The UE type states need to be updated, when the kinematic state estimate 2 of the associated UE is updated. To see how and to define the involved approximations, it can be written:

$$P(D|z^t) = P(D|z(t), z^{t-1}) \propto P(z(t)|D, z^{t-1})P(D|z^{t-1})$$ (H1)

$$\approx P(z(t)|D)P(D|z^{t-1}) \approx P(I(\hat{x}, f)|D)P(D|z^{t-1}).$$

Given the motivation of FIG. 1, the likelihood is hence thought of as a likelihood of the estimated IMM state, which should according to estimation theory, ideally contain all the information of the object. The likelihood is then expressed as a function of an indicator function $I(\hat{x}, f)$, with the likelihood being (close to) a maximum value whenever the state is consistent with the set of discrimination features f. The discrimination features are features of the kinematic state estimate that distinguish the typical behavior of a drone UE from a non-drone UE. The set of discrimination features, the evaluation of the likelihood, and the update of the states are elaborated here further below.

The implication of the above equation is that, provided that the likelihood is computed, then $P(D|z^t)$ can be computed from $P(D|z^{t-1})$ with iteration over the time t. The defining equation shows that the iteration is to be initialized with the prior probability. A truly recursive detection algorithm has then been obtained.

In the two-type-state case above, the other state update iteration follows similarly as:

$$P(\neg D|z^t) \approx P(I(\hat{x}, f)|\neg D)P(\neg D|z^{t-1}).$$ (H2)

The two type components are initialized:

$$P(t_0, D|z^0) = P_D$$ (H3)

$$P(t_0, \neg D|z^0) = 1 - P_D,$$ (H4)

and iterate for t:=t+T.

The final step of the update is a normalization step, intended to keep the sum of the state type probabilities equal to one, i.e.:

$$P_{norm}(D|z^t) = \frac{P(D|z^t)}{P(D|z^t) + P(\neg D|z^t)}$$ (H5)

$$P_{norm}(\neg D|z^t) = \frac{P(\neg D|z^t)}{P(D|z^t) + P(\neg D|z^t)}$$ (H6)

followed by:

$$P(D \mid z^t) = P_{norm}(D \mid z^t) \quad (H7)$$

$$P(\neg D \mid z^t) = P_{norm}(\neg D \mid z^t). \quad (H8)$$

After this everything is set for a new iteration.

A preferred underpinning idea for a feature likelihood computation is to assume that the kinematic UE type discrimination features are independent and therefore the type probability update can be performed separately for each feature.

To illustrate the feature likelihood computations, a case with a discrimination feature connected to the altitude is first considered. The altitude of the kinematic state estimate $\hat{x}$, with the ground altitude model value subtracted, together with the uncertainty measure, e.g. a standard deviation is the object of the discrimination features. The selection is based on the fact that the altitude of a drone is often larger than the altitude of terrestrial users, in a cell of a cellular system.

The likelihood is given by $P(I(\hat{x},h_{max})|D)$, where $h_{max}$ denotes a threshold altitude, c.f. eq. (H1). Here the indicator function is assumed to be equal to unity in the altitude region that is consistent with the probability of drone and zero otherwise. It is thus assumed that every estimated altitude above the height $h_{max}$ refers to a drone UE and everything below (but above ground) may refer to a drone or a no drone. It's hence a step function in this exemplifying case. As is well known, such a step or Heaviside function can be generated by integration over a distribution consisting of a first positive Dirac delta function and a second negative Dirac delta function, i.e. in the case of altitude:

$$I(\hat{x}_3, h_{max} \mid \neg D) = \int_{-\infty}^{\hat{x}_3} (\delta(x_3 - 0) - \delta(x_3 - h_{max}))dx_3. \quad (H9)$$

Figure 6:
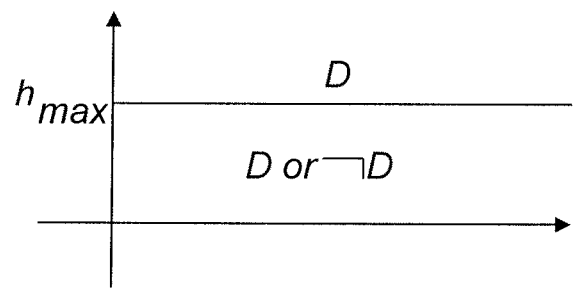
FIG. 6 is an illustration of an altitude discrimination feature.

This follows since a pedestrian or car cannot be located above altitude $h_{max}$, and not below the ground either, c.f. FIG. 6.

Now, this feature information is uncertain. The same is true for the state estimate. However, here it is assumed that kinematic state estimation uncertainty is accounted for by an increase of the feature information uncertainty. A further preferred underpinning idea is then to replace the Dirac delta functions in the equation above with probability distributions. The probability distributions then serve to smoothen the indicator function. For computational convenience, Gaussian one dimensional probability distribution functions are selected in the present cases. However, this is not intended to be considered as any limiting feature. Any other probability distribution function that models the uncertainties can be used as well.

The probability is then taken to be proportional to the indicator function. The computation of the feature likelihoods then follow:

$$P(\hat{x}_3, h_{max} \mid D) = \int_{-\infty}^{\hat{x}_3} \frac{1}{\sqrt{2\pi}\sigma_h} e^{-\frac{(x-0)^2}{2\sigma_h^2}} dx = \frac{1}{2} + \frac{1}{2}\mathrm{erf}\left(\frac{\hat{x}_3}{\sqrt{2}\sigma_h}\right) \quad (H10)$$

$$P(\hat{x}_3, h_{max} \mid \neg D) = \quad (H11)$$

$$\int_{-\infty}^{\hat{x}_3} \frac{1}{\sqrt{2\pi}\sigma_h} e^{-\frac{(x-0)^2}{2\sigma_h^2}} dx - \int_{-\infty}^{\hat{x}_3} \frac{1}{\sqrt{2\pi}\sigma_h} e^{-\frac{(x-h_{max})^2}{2\sigma_h^2}} dx =$$

$$= \frac{1}{2}\mathrm{erf}\left(\frac{\hat{x}_3}{\sqrt{2}\sigma_h}\right) - \frac{1}{2}\mathrm{erf}\left(\frac{\hat{x}_3 - h_{max}}{\sqrt{2}\sigma_h}\right),$$

where the Error Function erf(.) is defined as:

$$\mathrm{erf}(x) = \frac{2}{\sqrt{\pi}} \int_0^x \exp(-z^2)dz. \quad (H12)$$

The procedure is identical for other kinematic UE type discrimination features.

A set of useful kinematic UE type discrimination features, being associated with drone behavior, has been identified. One or several of the here below presented kinematic UE type discrimination features can be selected to be used in the procedure described above. In other words, the set of features used by the disclosed detection algorithm, is preferably a subset of at least the following functions of the state 2.

As has already been indicated, the altitude of the kinematic state estimate $\hat{x}$ with the ground altitude model value subtracted, can be used together with the uncertainty measure, e.g. a standard deviation as discussed below. Another kinematic UE type discrimination feature is the altitude velocity of the kinematic state estimate $\hat{x}$, together with a feature uncertainty, e.g. a standard deviation discussed above. The horizontal speed of the kinematic state estimate $\hat{x}$, together with a feature uncertainty, e.g. a standard deviation as discussed above, can also be used. The magnitude of the acceleration of the kinematic state $\hat{x}$, together with a feature uncertainty e.g. a standard deviation as discussed above is another possibility. Also the horizontal position of the state vector $\hat{x}$, together with a feature uncertainty, e.g. a standard deviation as discussed above can be used.

Typically, old information needs to be discarded when kinematic state estimation is performed. This is preferably achieved by the well-known compromise between the sizes of the systems noise covariance matrix and the measurement covariance matrix in each EKF mode of the present IMM filter.

Information discarding may preferably also be needed in the type estimation. One way to achieve this is to assume linear diffusion of type probabilities towards a constant probability vector, typically with equal probability for each type alternative. Considering the time interval [t, t+Δt] it follows that:

$$P(t + \Delta t, D \mid z^t) - P(t, D \mid z^t) \approx -\alpha P(t, D \mid z^t)\Delta t + \alpha P_D \Delta t. \quad (H13)$$

Here α is a pre-determined constant and $P_D$ is the constant, typically initial, drone probability. Letting the time interval approach zero renders a linear differential equation with solution:

$$P(t + T, D \mid z^t) = P_D + (P(t, D \mid z^t) - P_D)\alpha^{-\alpha T}. \quad (H14)$$

This equation can be used to propagate the probability of drone between two update time instances. An equivalent equation can be derived for the probability of not a drone.

The assigning of a UE to be a drone UE can be done in many ways. The simplest and preferred way is to declare that the state estimate represents a drone, as soon as:

$$P(D \mid z^t) > \text{threshold}_{assign}, \quad (H15)$$

where $\text{threshold}_{assign}$ is a predetermined assigning threshold slightly less than 1.

APPENDIX I

Figure 10:
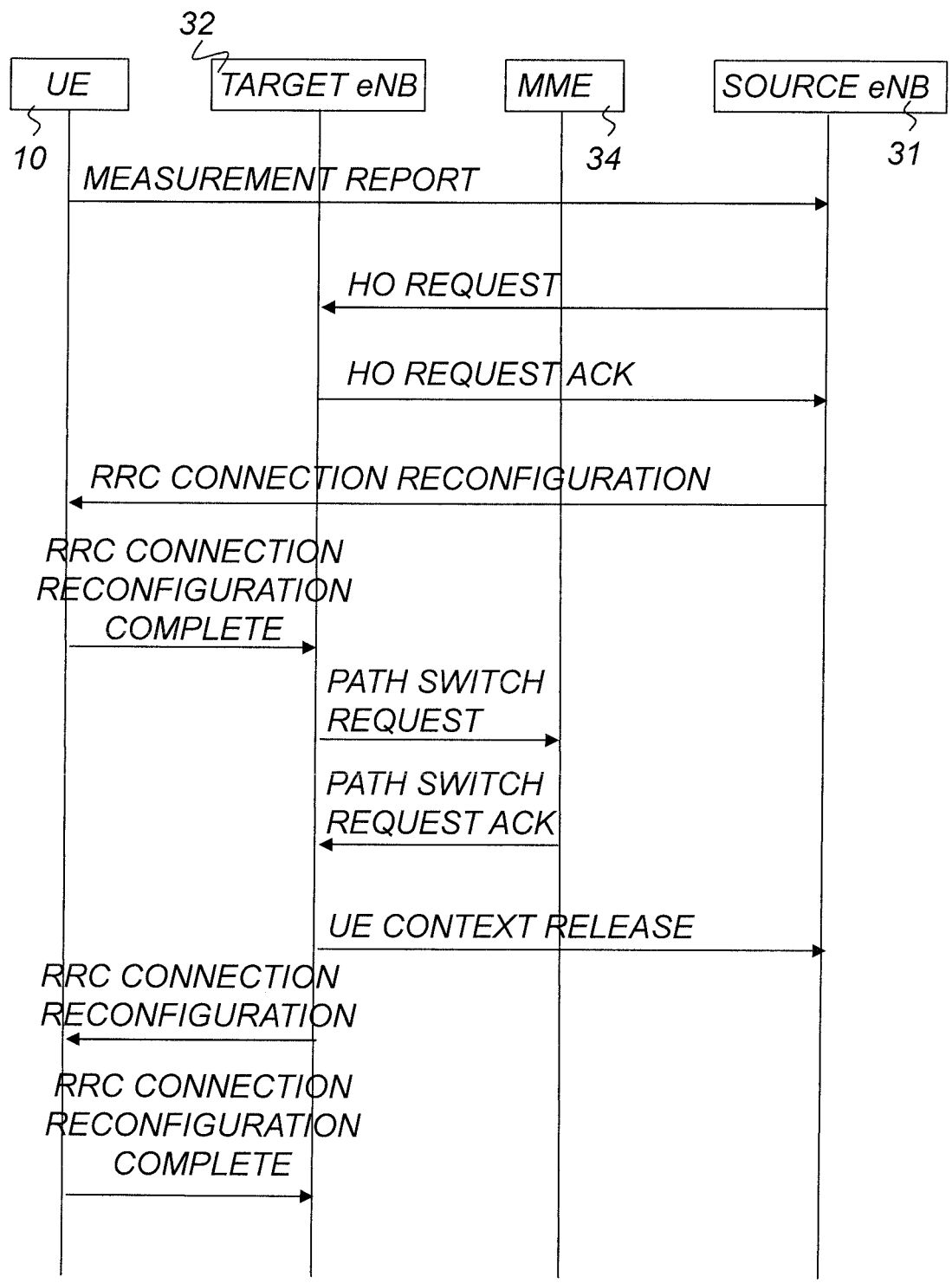
FIG. 10 illustrates schematically an LTE X2 handover target eNB procedure.

A LTE X2 HO procedure is shown in FIG. 10. The main communication takes place directly between the involved eNBs. Measurement reports are intermittently sent from the UE 10 to the source eNB 31. When a need for a HO is detected, e.g. when the connection to a target eNB 32 seems to be beneficial, the source eNB 31 sends a HO request to the target eNB 32. The target eNB replies with a HO request acknowledgement. The source eNB 31 sends a request for a Radio Resource Control (RRC) connection reconfiguration to the UE 10. The UE 10 replies with a RRC connection reconfiguration complete message to the target eNB 32. The target eNB sends a path switch request to the Mobility Management Entity (MME) 34, which replies with a path switch request acknowledgement. The target eNB 32 sends a UE context release message to the source eNB 34 as a confirmation of the change. A request for a RRC connection reconfiguration is sent from the target eNB 32 to the UE 10, which replies with replies with a RRC connection reconfiguration complete message to the target eNB 32.

Figure 11:
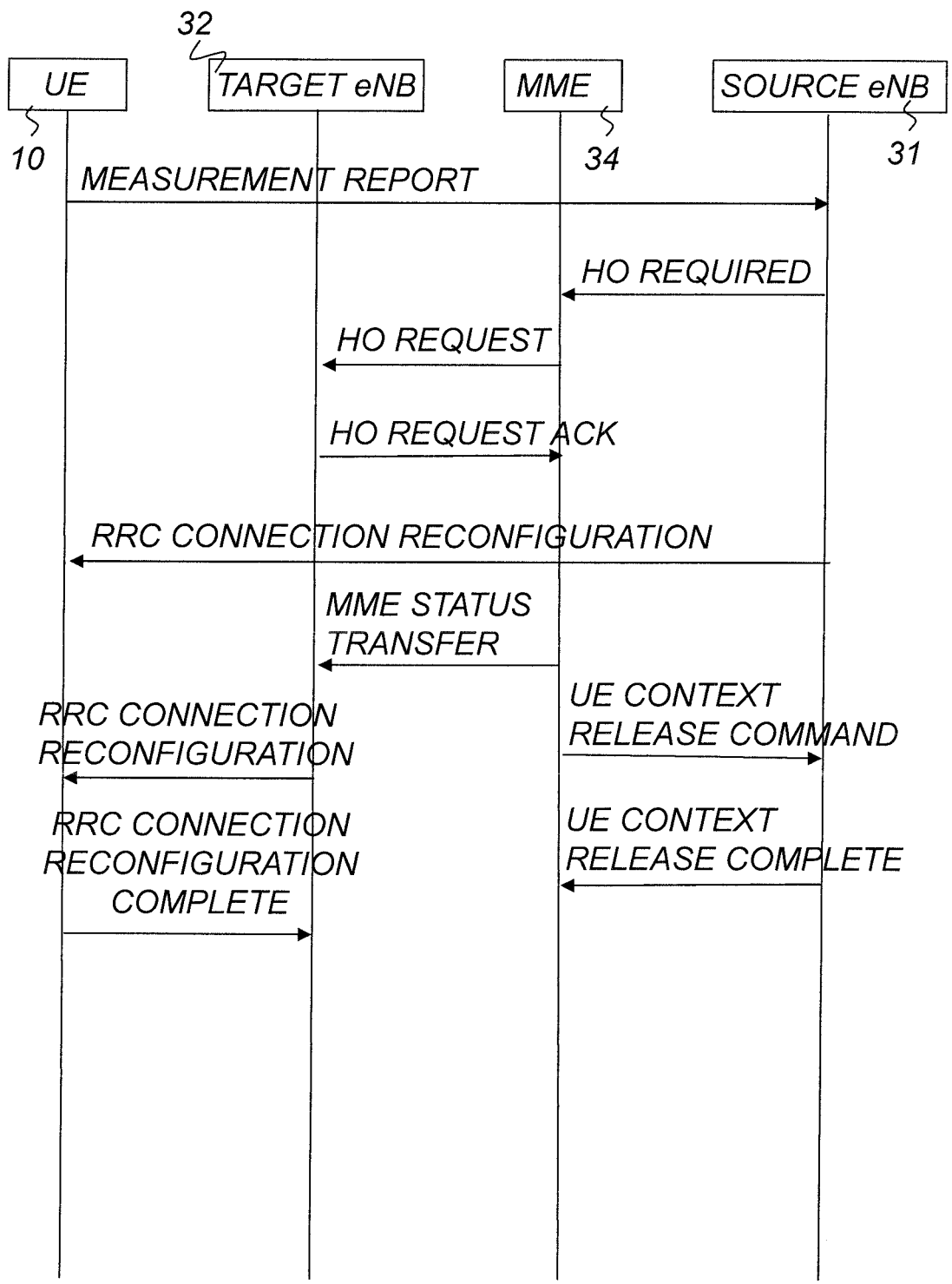
FIG. 11 illustrates schematically an LTE S1 handover target eNB procedure.

A LTE S1 HO procedure can also be performed. The MME is then more active in the process. This is illustrated schematically in FIG. 11. Measurement reports are intermittently sent from the UE 10 to the source eNB 31. When a need for a HO is detected, e.g. when the connection to a target eNB 32 seems to be beneficial, the source eNB 31 sends a message to the MME 34 that HO is required. The MME 34 sends a HO request to the target eNB 32 and the target eNB 32 replies to the MME 34 with a HO request acknowledgement. The source eNB 31 sends a RRC connection reconfiguration message to the UE 10. The MME 34 transfers the MME status to the target eNB 32. A UE context release command is sent from the MME 34 to the source eNB 31, which replies with a UE context release complete message. The MME 34 also sends a request for a RRC connection reconfiguration is sent from the target eNB 32 to the UE 10, which replies with replies with a RRC connection reconfiguration complete message to the target eNB 32.

ABBREVIATIONS

ASIC Application Specific Integrated Circuits
BTS Base Transceiver Stations
CD Compact Disc
COTS Common Off-The-Shelf
CPE Customer Premises Equipment
CPU Central Processing Units
DSP Digital Signal Processors
DVD Digital Versatile Disc
EKF Extended Kalman filter
eNB evolved Node B
EPC Evolved Packet Core
E-UTRA Evolved Universal Terrestrial Radio Access
FPGA Field Programmable Gate Arrays
GIS geographical information system
gNBs Next Generation NodeB
HDD Hard Disk Drive
HO HandOver
HW hardware
IE Information Element
IMM Interacting-Multiple-Model
I/O input/output
LEE Laptop Embedded Equipment
LG Linear-Gaussian
LME Laptop Mounted Equipment
LTE Long-Term Evolution
MEM memory units
MME Mobility Management Entity
NB Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PDU Protocol Data Unit
PLC Programmable Logic Controllers
RAM Random Access Memory
REG registers
ROM Read-Only Memory
RRU Remote Radio Units
RTT Round-Trip-Time
SAR synthetic aperture radar
STA Station
STMSI Serving Temporary Mobile Subscription Identity
SW software
UE User Equipment
USB Universal Serial Bus
VM Virtual Machine
VMM Virtual Machine Monitor
VNE Virtual Network Element
WNIC Wireless Network Interface Controller

REFERENCES

[1] T. Wigren, "Wireless hybrid positioning based on surface modeling with polygon support", Proc. VTC 2018 Spring, Porto, Portugal, June, 2018.

The invention claimed is:

1. A method for sharing user equipment state estimates between nodes within a wireless communication network, wherein a user equipment is included as part of an airborne drone, the method comprising:
    initiating transmission of obtained user equipment kinematic state estimate information and obtained user equipment type state estimate information to a receiving network node as a response to an obtained indication of a need for sharing user equipment state estimates;
    said obtained user equipment kinematic state estimate information comprising a latest kinematic state update time, mode state vector estimates, mode covariance matrices and mode probabilities valid for said latest kinematic state update time for at least one user equipment kinematic mode; and said obtained user equipment type state estimate information comprising a latest type state update time and a type state probability estimate valid for said latest type state update time;

wherein the obtained user equipment kinematic state estimate information further comprises tracking coordinate system parameters or performing a user equipment kinematic state estimation, given said mode state vector estimates, said mode covariance matrices, and said mode probabilities, in which said user equipment kinematic state estimate information further comprises tracking coordinate system parameters.

2. The method according to claim 1, wherein said obtained user equipment kinematic state estimate information further comprises system noise covariance matrices for each of said at least one user equipment kinematic mode or measurement noise covariance matrices for each of said at least one user equipment kinematic mode.

3. The method according to claim 1, wherein:
said user equipment type state estimate information further comprises parameters of discrimination features for said user equipment type state estimation;
said indication of the need for sharing user equipment state estimates is a handover request;
said transmission is to be performed via a private message;
said transmission is to be performed to a base station;
said transmission is to be performed between two base stations via a core network node; or
any combination thereof.

4. A method for sharing user equipment state estimates between nodes in a wireless communication network, wherein a user equipment is included as part of an airborne drone, the method comprising:
receiving user equipment kinematic state estimate information and user equipment type state estimate information from a sending network node as a response to an indication of a need for sharing user equipment state estimates;
said user equipment kinematic state estimate information comprising a latest kinematic state update time, mode state vector estimates, mode covariance matrices and mode probabilities valid for said latest kinematic state update time for at least one user equipment kinematic mode;
said user equipment type state estimate information comprising a latest type state update time and type state probability estimate valid for said latest type state update time; and
propagating a user equipment kinematic state estimate and a user equipment type state estimate to a present time based on said user equipment kinematic state estimate information and said user equipment type state estimate information, respectively;
wherein the receiving user equipment kinematic state estimate information and propagating the user equipment kinematic state estimate is to a present time and said received user equipment kinematic state estimate information further comprises tracking coordinate system parameters or performing a user equipment kinematic state estimation, based on said mode state vector estimates, said mode covariance matrices, and said mode probabilities, propagated to a present time based on said latest kinematic state update time in which the received user equipment kinematic state estimate information further comprises tracking coordinate system parameters.

5. The method according to claim 4, wherein said received user equipment kinematic state estimate information further comprises system noise covariance matrices for each of said at least one user equipment kinematic mode or measurement noise covariance matrices for each of said at least one user equipment kinematic mode.

6. The method according to claim 4, wherein:
said user equipment type state estimate information further comprises parameters of discrimination features for said user equipment type state estimation;
said indication of a need for sharing user equipment state estimates is a handover request;
said receiving is performed via a private message;
said receiving is performed in a base station;
said user equipment kinematic state estimate information, user equipment type state estimate information, or both, is received from a base station;
said user equipment kinematic state estimate information, user equipment type state estimate information, or both, is received from a base station in a base station via a core network node; or
any combination thereof.

7. A network node configured for sharing user equipment state estimates within a wireless communication network, wherein a user equipment is included as part of an airborne drone, the network node comprising:
a processor; and
a memory comprising a computer program which, when executed by the processor, causes the network node to:
initiate transmission of obtained user equipment kinematic state estimate information and obtained user equipment type state estimate information to a receiving network node as a response to an obtained indication of a need for sharing user equipment state estimates;
said obtained user equipment kinematic state estimate information comprising a latest kinematic state update time, mode state vector estimates, mode covariance matrices and mode probabilities valid for said latest kinematic state update time for at least one user equipment kinematic mode; and
said obtained user equipment type state estimate information comprising a latest type state update time and type state probability estimate valid for said latest type state update time;
wherein the obtained user equipment kinematic state estimate information further comprises tracking coordinate system parameters or perform a user equipment kinematic state estimation, given said mode state vector estimates, said mode covariance matrices, and said mode probabilities, in which said user equipment kinematic state estimate information further comprises tracking coordinate system parameters.

8. The network node according to claim 7, wherein said obtained user equipment kinematic state estimate information further comprises tracking coordinate system parameters, system noise covariance matrices for each of said at least one user equipment kinematic mode, or measurement noise covariance matrices for each of said at least one user equipment kinematic mode.

9. The network node according to claim 7, wherein:
said user equipment type state estimate information further comprises parameters of discrimination features for said user equipment type state estimation;
said indication of the need for sharing user equipment state estimates is a handover request;

said transmission is to be performed via a private message;
said transmission is to be performed to a base station;
said network node is a base station;
said transmission is to be performed between two base stations via a core network node; or
any combination thereof.

10. A network node configured for sharing user equipment state estimates within a wireless communication network, wherein a user equipment is included as part of an airborne drone, the network node comprising:
   a processor; and
   a memory comprising a computer program which, when executed by the processor, causes the network node to:
      receive user equipment kinematic state estimate information and user equipment type state estimate information from a sending network node as a response to an indication of a need for sharing user equipment state estimates;
      said user equipment kinematic state estimate information comprising a latest kinematic state update time, mode state vector estimates, mode covariance matrices and mode probabilities valid for said latest kinematic state update time for at least one user equipment kinematic mode;
      said user equipment type state estimate information comprising a latest type state update time and type state probability estimate valid for said latest type state update time; and
      propagate a user equipment kinematic state estimate and a user equipment type state estimate to a present time based on said user equipment kinematic state estimate information and said user equipment type state estimate information, respectively;
   wherein the received user equipment kinematic state estimate information and propagating of the user equipment kinematic state estimate is to a present time and said received user equipment kinematic state estimate information further comprises tracking coordinate system parameters or perform a user equipment kinematic state estimation, based on said mode state vector estimates, said mode covariance matrices, and said mode probabilities, propagated to a present time based on said latest kinematic state update time in which the received user equipment kinematic state estimate information further comprises tracking coordinate system parameters.

11. The network node according to claim 10, wherein said received user equipment kinematic state estimate information further comprises tracking coordinate system parameters, system noise covariance matrices for each of said at least one user equipment kinematic mode, or measurement noise covariance matrices for each of said at least one user equipment kinematic mode.

12. The network node according to claim 10, wherein:
   said user equipment type state estimate information further comprises parameters of discrimination features for said user equipment type state estimation;
   said indication of a need for sharing user equipment state estimates is a handover request;
   said receiving is performed via a private message;
   said network node is a base station;
   said user equipment kinematic state estimate information, user equipment type state estimate information are received from a base station;
   said user equipment kinematic state estimate information, user equipment type state estimate information are received from a base station via a core network node; or
   any combination thereof.

* * * * *